(12) United States Patent
Junge et al.

(10) Patent No.: US 7,785,678 B2
(45) Date of Patent: Aug. 31, 2010

(54) LIQUID-CRYSTALLINE MIXTURES AND LIQUID-CRYSTAL DISPLAYS

(75) Inventors: Michael Junge, Pfungstadt (DE); Ursula Patwal, Reinheim/Georgenhausen (DE); Volker Reiffenrath, Rossdorf (DE)

(73) Assignee: Merck Patent GmbH, Darmstadt (DE)

( * ) Notice: Subject to any disclaimer, the term of this patent is extended or adjusted under 35 U.S.C. 154(b) by 12 days.

(21) Appl. No.: 12/297,062

(22) PCT Filed: Mar. 21, 2007

(86) PCT No.: PCT/EP2007/002508

§ 371 (c)(1),
(2), (4) Date: Oct. 14, 2008

(87) PCT Pub. No.: WO2007/118572

PCT Pub. Date: Oct. 25, 2007

(65) Prior Publication Data

US 2009/0201457 A1  Aug. 13, 2009

(30) Foreign Application Priority Data

Apr. 15, 2006  (DE) .................. 10 2006 017 757

(51) Int. Cl.
C09K 19/34 (2006.01)
C09K 19/32 (2006.01)
C09K 19/30 (2006.01)
C09K 19/12 (2006.01)
C07D 211/84 (2006.01)
C07D 213/60 (2006.01)
C07D 405/04 (2006.01)

(52) U.S. Cl. ............. 428/1.1; 252/299.61; 252/299.62; 252/299.63; 252/299.66; 549/370; 546/282.4; 546/286; 546/303; 546/345

(58) Field of Classification Search .................. 428/1.1; 252/299.61, 299.62, 299.63, 299.66, 299.67, 252/299.5; 546/282.4, 286, 303, 345; 549/370

See application file for complete search history.

(56) References Cited

U.S. PATENT DOCUMENTS

| 4,684,477 | A | 8/1987 | Sugimori et al. |
| 5,445,763 | A | 8/1995 | Schlosser et al. |
| 5,454,975 | A | 10/1995 | Reiffenrath et al. |
| 6,233,034 | B1 | 5/2001 | Lee et al. |
| 2002/0043645 | A1 | 4/2002 | Heckmeier et al. |

FOREIGN PATENT DOCUMENTS

| DE | 44 09 431 A1 | 10/1994 |
| DE | 198 24 137 A1 | 7/1999 |
| DE | 101 11 139 A1 | 10/2001 |
| EP | 0 194 153 A2 | 9/1986 |
| EP | 0 310 676 A1 | 4/1989 |
| EP | 0 519 370 A2 | 12/1992 |
| WO | WO 91/10936 A1 | 7/1991 |

OTHER PUBLICATIONS

A. I. Pavluchenko et al. "Liquid Crystalline 2,5-Disubstituted Pyridine Derivatives", Liquid Crystals, vol. 19, No. 6 (1995) pp. 811-821.

*Primary Examiner*—Shean C Wu
(74) *Attorney, Agent, or Firm*—Millen, White, Zelano, Branigan, P.C.

(57) ABSTRACT

The present invention relates to liquid-crystalline mixtures and to novel compounds therefor, and to the use thereof in nematic liquid-crystal displays having positive dielectric anisotropy, such as, for example, STN or IPS displays, which are characterised in that they comprise one or more compounds of the formula (I) in which $R^1, A^1, A^2, Z^1, Z^2$, n are as defined in claim (1).

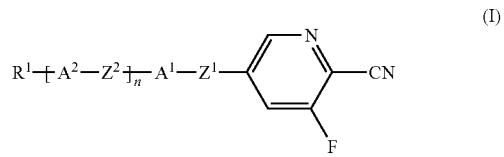

(I)

16 Claims, 1 Drawing Sheet

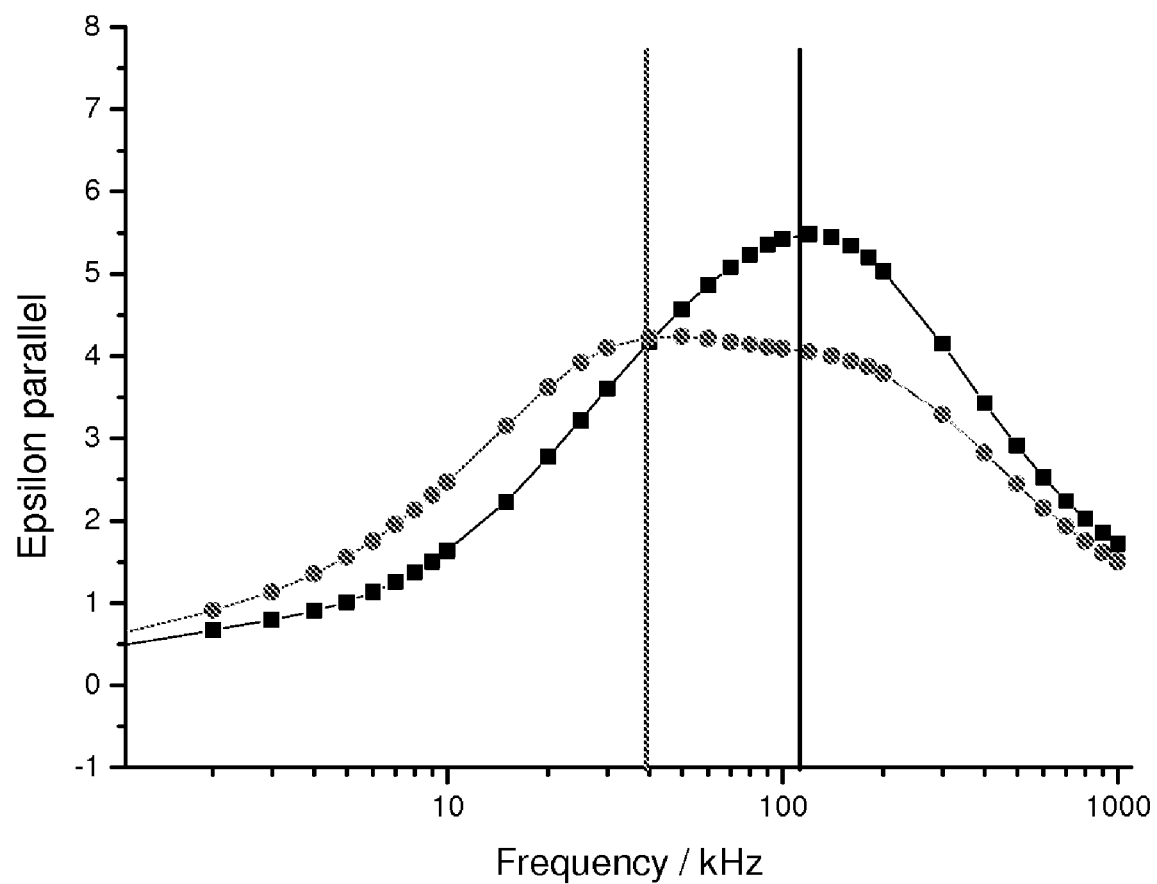

LIQUID-CRYSTALLINE MIXTURES AND LIQUID-CRYSTAL DISPLAYS

The present invention relates to liquid-crystalline mixtures and to novel compounds therefor, and to the use thereof in nematic liquid-crystal displays having high dielectric anisotropy, such as, for example, STN or IPS displays.

TN displays are known, for example from M. Schadt and W. Helfrich, Appl. Phys. Lett., 18, 127 (1971). STN displays are known, for example from EP 0 131 216 B1; DE 34 23 993 A1; EP 0 098 070 A2; M. Schadt and F. Leenhouts, 17th Freiburg Symposium on Liquid Crystals (8.-10.04.87); K. Kawasaki et al., SID 87 Digest 391 (20.6); M. Schadt and F. Leenhouts, SID 87 Digest 372 (20.1); K. Katoh et al., Japanese Journal of Applied Physics, Vol. 26, No. 11, L 1784-L 1786 (1987); F. Leenhouts et al., Appl. Phys. Lett. 50 (21), 1468 (1987); H. A. van Sprang and H. G. Koopman, J. Appl. Phys. 62 (5), 1734 (1987); T. J. Scheffer and J. Nehring, Appl. Phys. Lett. 45 (10), 1021 (1984); M. Schadt and F. Leenhouts, Appl. Phys. Lett. 50 (5), 236 (1987) and E. P. Raynes, Mol. Cryst. Liq. Cryst. Letters Vol. 4 (1), pp. 1-8 (1986). The term STN here covers any relatively highly twisted display element having a twist angle with a value of between 100° and 600°, such as, for example, the display elements according to Waters et al. (C. M. Waters et al., Proc. Soc. Inf. Disp. (New York) (1985) (3rd Intern. Display Conference, Kobe, Japan), STN-LCDs (DE 35 03 259 A1), SBE-LCDs (T. J. Scheffer and J. Nehring, Appl. Phys. Lett. 45 (1984) 1021), OMI-LCDs (M. Schadt and F. Leenhouts, Appl. Phys. Lett. 50 (1987), 236, DST-LCDs (EP 0 246 842 A2) or BW-STN-LCDs (K. Kawasaki et al., SID 87 Digest 391 (20.6)).

In addition to optimisation of the contrast and response times, further important requirements are made of mixtures of this type:

1. broad d/p window,
2. high long-term chemical stability,
3. high electrical resistance, and
4. low frequency and temperature dependence of the threshold voltage.

The parameter combinations achieved are still far from adequate, in particular for high-multiplex STN displays (with a multiplex rate in the range from about 1/160-1/400), but also for medium- and low-multiplex STN displays (with multiplex rates in the region of about 1/64 and 1/16 respectively), and TN displays. This is partly attributable to the fact that the various requirements are affected in opposite manners by material parameters.

Thus, there continues to be a great demand for liquid-crystalline mixtures, in particular for TN and STN displays, having very short response times at the same time as a large working-temperature range, high electro-optical characteristic-line steepness, good angle dependence of the contrast and low temperature dependence and frequency dependence of the threshold voltage, which meet the requirements indicated above.

International Patent Application WO 91/10936 discloses a liquid-crystal display in which the electrical signals are generated in such a way that the electric fields have a significant component parallel to the liquid-crystal layer (IPS, in-plane switching). The principles of operation of a display of this type are described, for example, by R. A. Soref in Journal of Applied Physics, Vol. 45, No. 12, pp. 5466-5468 (1974).

For example, EP 0 588 568 discloses various possibilities for the design of the electrodes and for addressing a display of this type. DE 198 24 137 likewise describes various embodiments of IPS displays of this type.

Liquid-crystalline materials for IPS displays of this type are described, for example, in DE 198 48 181 or in DE 101 11 139.

DE 101 11 139 discloses, inter alia, cyanopyrimidine compounds of the formula

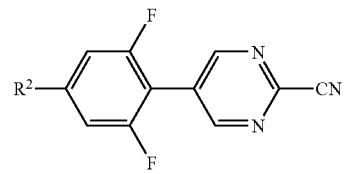

in which $R^2$ represents a chain having up to 8 atoms, as co-components of a liquid-crystal mixture.

U.S. Pat. No. 5,445,763 discloses smectic compounds containing a monofluorinated pyridine ring for use in ferroelectric displays. The document contains no references to nematic compounds which carry a pyridine ring at the end of the molecule and a nitrile group. The compounds disclosed therein are intended to achieve the object of providing non-polar compounds or compounds having negative dielectric anisotropy, but not compounds having particularly high, positive dielectric anisotropy.

The IPS displays which are already known are characterised by inadequate, long response times and often by excessively high operating voltages. There is thus a demand for IPS displays which do not have these disadvantages or only do so to a reduced extent.

The STN and IPS displays can be regarded as representative of displays containing a liquid-crystalline medium based on a mixture of positive dielectric anisotropy, such as, for example, generally TN, TN-TFT, HTN, STN, OCB and IPS displays, and also other display types which are operated with non-nematic liquid-crystal phases, in the isotropic phase or in a blue phase.

For the said display types, use is generally made of a predominant fraction of compounds having high dielectric anisotropy. The use of these compounds simultaneously reduces the content of low-viscosity and high-clearing-point compounds. It is therefore desirable to achieve an adequate level of the total polarity of the mixture by means of a relatively low proportion of high-polarity compounds.

The present invention thus has the object of providing nematic liquid-crystal displays which do not have the above-mentioned disadvantages, or only do so to a reduced extent, at the same time have short response times, in particular at low temperatures, and have very low frequency dependence of the threshold voltage.

BRIEF DESCRIPTION OF THE DRAWING

The relaxation frequency is determined by measuring the dielectric constant parallel to the longitudinal molecular axis.

Surprisingly, it has now been found that this object is achieved by the provision of liquid-crystal mixtures which comprise one or more compounds of the formula I

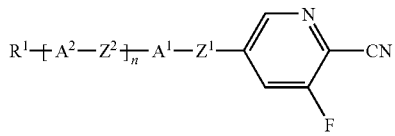

in which
R¹ denotes an alkyl radical having up to 15 C atoms which is unsubstituted, monosubstituted by CN or CF₃ or at least monosubstituted by halogen, where, in addition, one or more CH₂ groups in these radicals may be replaced by —O—, —S—, —C≡C—, —CH=CH—, —(CO)O— or —O(CO)— in such a way that O atoms are not linked directly to one another,
A¹, A² each, independently, denote a ring system of the formulae

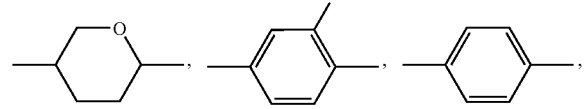

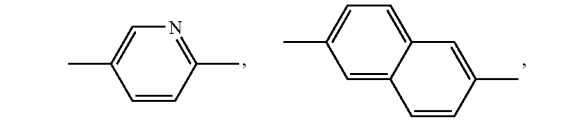

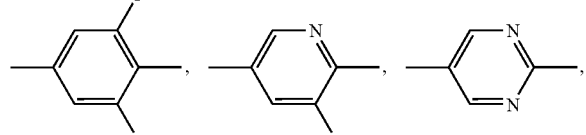

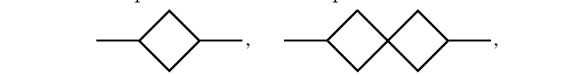

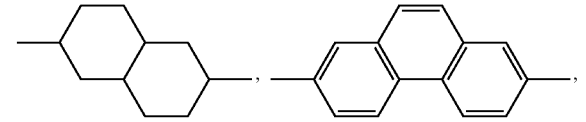

pointing to the left or right,
Z¹, Z² each, independently, denote a single bond, —CH=CH—, —C≡C— or —CH₂CH₂—, and
n denotes 0, 1 or 2.

The invention furthermore relates to compounds of the formula I. The compounds of the formula I have extremely high dielectric anisotropy. They have a broad range of applications, in particular as components of optical media of electro-optical components. They can be employed alone and preferably in combination with further components of liquid-crystalline media. They are particularly suitable for use in the nematic liquid-crystal media according to the invention. It is apparent from the use in STN mixtures that particularly low threshold voltages can be achieved using compounds of the formula I. It has likewise been found, surprisingly, that a lower frequency dependence of the threshold voltage is also achieved than with comparable high-polarity compounds.

Of the compounds according to the invention, preference is given to those in which optionally:
Z¹ represents a single bond,
n is 0 or 1, preferably 0,
A¹, A², independently of one another, denote a ring of the formulae

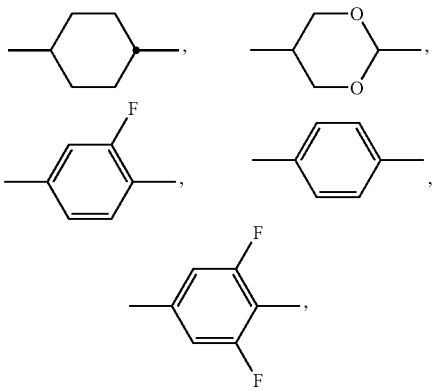

and in particular of the formulae

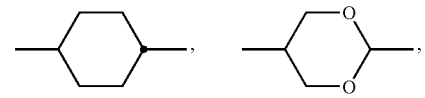

and/or
R¹ denotes an alkyl radical having 1 to 7 C atoms or an alkenyl radical having 2 to 7 C atoms.

Particular preference is given to combinations of these features and features which will be deduced by the person skilled in the art directly from consideration and comparison of the examples.

In addition, preference is given to liquid-crystal mixtures in accordance with the invention which comprise the particularly preferred compounds of the formula I.

The fluorocyanopyridines are prepared by various methods, depending on the moiety -A¹-Z¹-. The following schemes 1 to 3 show typical preparation procedures, which are based on synthetic methods which are known in principle.

Scheme 1. Preparation of the fluorocyanopyridines.

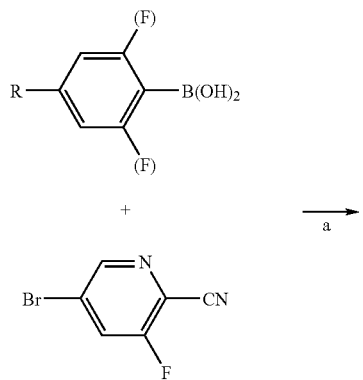

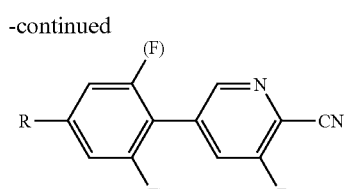

a) Palladium[0] catalyst, base, toluene; R = alkyl, alkylaryl, alkylcyclohexyl, etc.

Scheme 2. Preparation of the flurocyanopyridines.

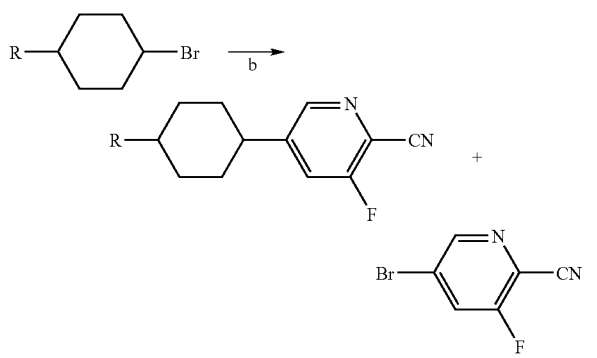

b) 1. ZnBr$_2$, toluene/THF, 2. Li, 3. Palladium[II] chloride, Py bromide; R = alkyl, alkylcyclohexyl, etc.

Scheme 3. Preparation of the fluorocyanopyridines.

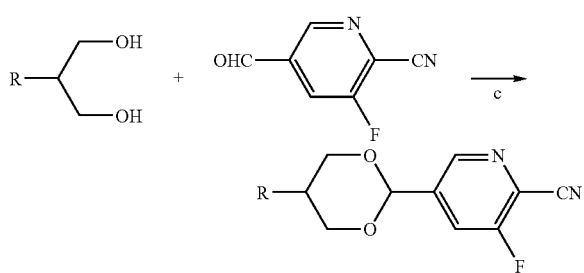

c) p-TsOH, toluene; R = alkyl, alkylcyclohexyl, etc.

The reactions are based on the Suzuki-Miyaura reaction (Scheme 1), the Luche reaction (cross-coupling, Scheme 2) and an acetal formation for the preparation of the dioxane (Scheme 3). Numerous modifications of or alternatives to these reactions are known from the specialist literature. Modification of the starting materials also enables the preparation of compounds in which $Z^1$ denotes a —C=C— (Heck coupling), —CH$_2$CH$_2$— (modification of the alkyl bromide from Scheme 2) or —C≡C— (Sonogashira-Hagihara reaction) group.

The use of the compounds of the formula I in the mixtures according to the invention for nematic liquid-crystal displays produces increased dielectric anisotropy $\Delta\in$ or, through adjustment of the other parameters of the mixture:

a high clearing point,
low rotational viscosity and thus very short response times, in particular at low temperatures, and
low frequency dependence of the threshold voltage.

The compounds of the formula I significantly shorten the response times of STN mixtures with at the same time low frequency dependence of the threshold voltage.

The mixtures according to the invention are furthermore distinguished by the following properties:

low frequency dependence of the threshold voltage,
long storage times in the display at low temperatures and
a high relaxation frequency.

The drawing attached to this document shows in a diagram two curves for determination of the relaxation frequency. The relaxation frequency is determined by a measurement series of the value of the dielectric constant parallel to the longitudinal molecular axis ($\in_\parallel$) as a function of the frequency. The square measurement points (■) show the measurement values for a liquid-crystal mixture according to the invention. The circular measurement points (●) belong to a comparative mixture consisting of compounds from the prior art. The comparative mixture is selected in such a way that it has comparable values for important parameters (cl.p., $\Delta$n, $\Delta\in$, $V_{10}$). The mixtures are described in greater detail in the examples. The maximum of the curve indicates the relaxation frequency. A high relaxation frequency is necessary for fault-free addressing of highly multiplexed matrix displays. The mixtures according to the invention enable a high relaxation frequency and thus matrix displays having high resolution and at the same time high refresh rates.

The invention furthermore relates to a nematic liquid-crystal display, in particular an STN liquid-crystal display, having two outer plates, which, together with a frame, form a cell,
a nematic liquid-crystal mixture having positive dielectric anisotropy located in the cell,
electrodes with alignment layers on the insides of the outer plates,
a pre-tilt angle between the longitudinal axis of the molecules at the surface of the outer plates and the outer plates of 0° to 30°, and
a twist angle of the liquid-crystal mixture in the cell from alignment layer to alignment layer with a value of between 22.5° and 600°, which is characterised in that the nematic liquid-crystal mixture comprises at least one compound of the formula I.

The liquid-crystal mixtures according to the invention preferably consist of at least two components, each comprising at least one compound.

In a particularly preferred embodiment, the mixture according to the invention consists of a nematic liquid-crystal mixture which comprises:

a) 15 to 99% by weight of a liquid-crystalline component A consisting of one or more compounds having a dielectric anisotropy of greater than +1.5;
b) 1 to 85% by weight of a liquid-crystalline component B consisting of one or more compounds having a dielectric anisotropy of between −1.5 and +1.5;
c) 0 to 20% by weight of a liquid-crystalline component C consisting of one or more compounds having a dielectric anisotropy of below −1.5, and
d) optionally an optically active component D in such an amount that the ratio between the layer thickness (separation of the outer plates) and the natural pitch of the chiral nematic liquid-crystal mixture is about 0.2 to 1.3, where the liquid-crystal mixture comprises at least one compound of the formula I as component A.

The invention also relates to corresponding liquid-crystal mixtures for use in STN and IPS displays, in particular in STN displays with medium and high multiplexing.

The compounds of the formula I preferably include compounds in which $R^1$ denotes a straight-chain alkyl or alkenyl group. Z preferably denotes a single bond. Compounds of the formulae I1 to I11 are very particularly preferably included:

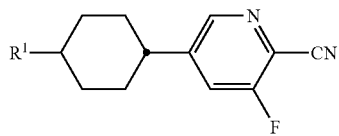
I1

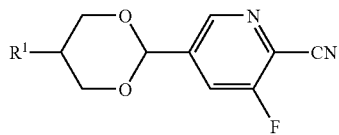
I2

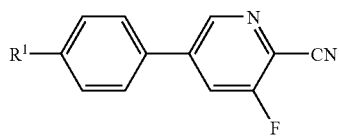
I3

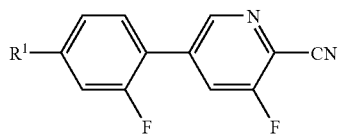
I4

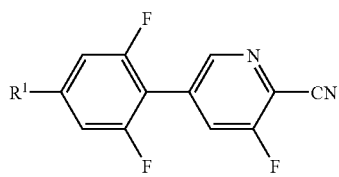
I5

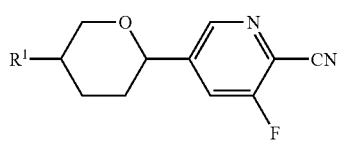
I6

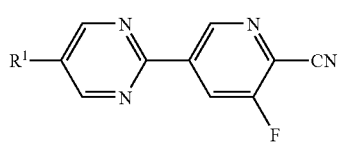
I7

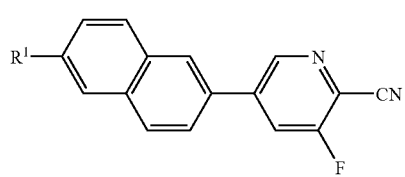
I8

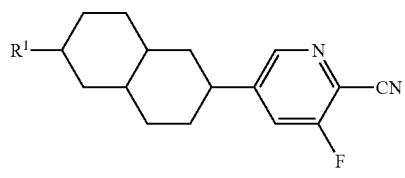
I9

-continued

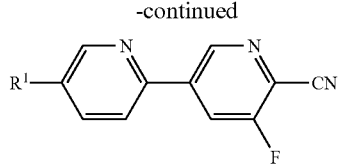
I10

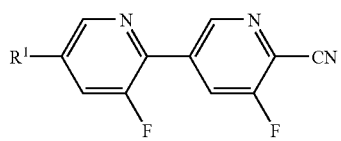
I11 in which $R^1$ is as defined above.

Particular preference is given to mixtures according to the invention which comprise at least one compound of the formulae I1, I2, I3 and/or I4, in particular at least one compound of the formula I1 or I2.

Besides the compounds of the formula I, the liquid-crystal mixtures according to the invention additionally preferably comprise one or more alkenyl compounds of the formula II

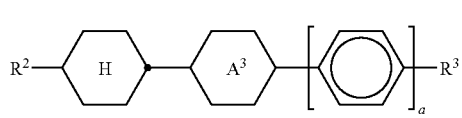
II in which $R^2$ denotes an alkenyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—, —C≡C—, —CH=CH—, —(CO)O— or —O(CO)— in such a way that O atoms are not linked directly to one another, $R^3$ is defined independently like $R^1$, the ring $A^3$ denotes 1,4-phenylene or trans-1,4-cyclohexylene, and a is 0 or 1.

Preferred compounds of the formula II are selected from the formulae IIa to IIi:

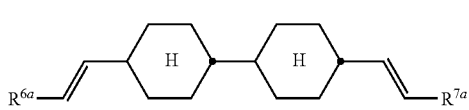
IIa

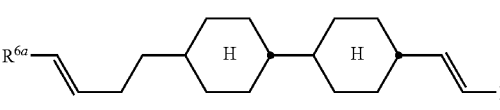
IIb

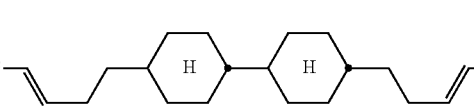
IIc

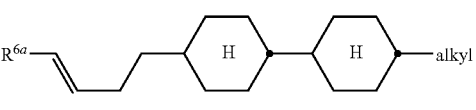
IId

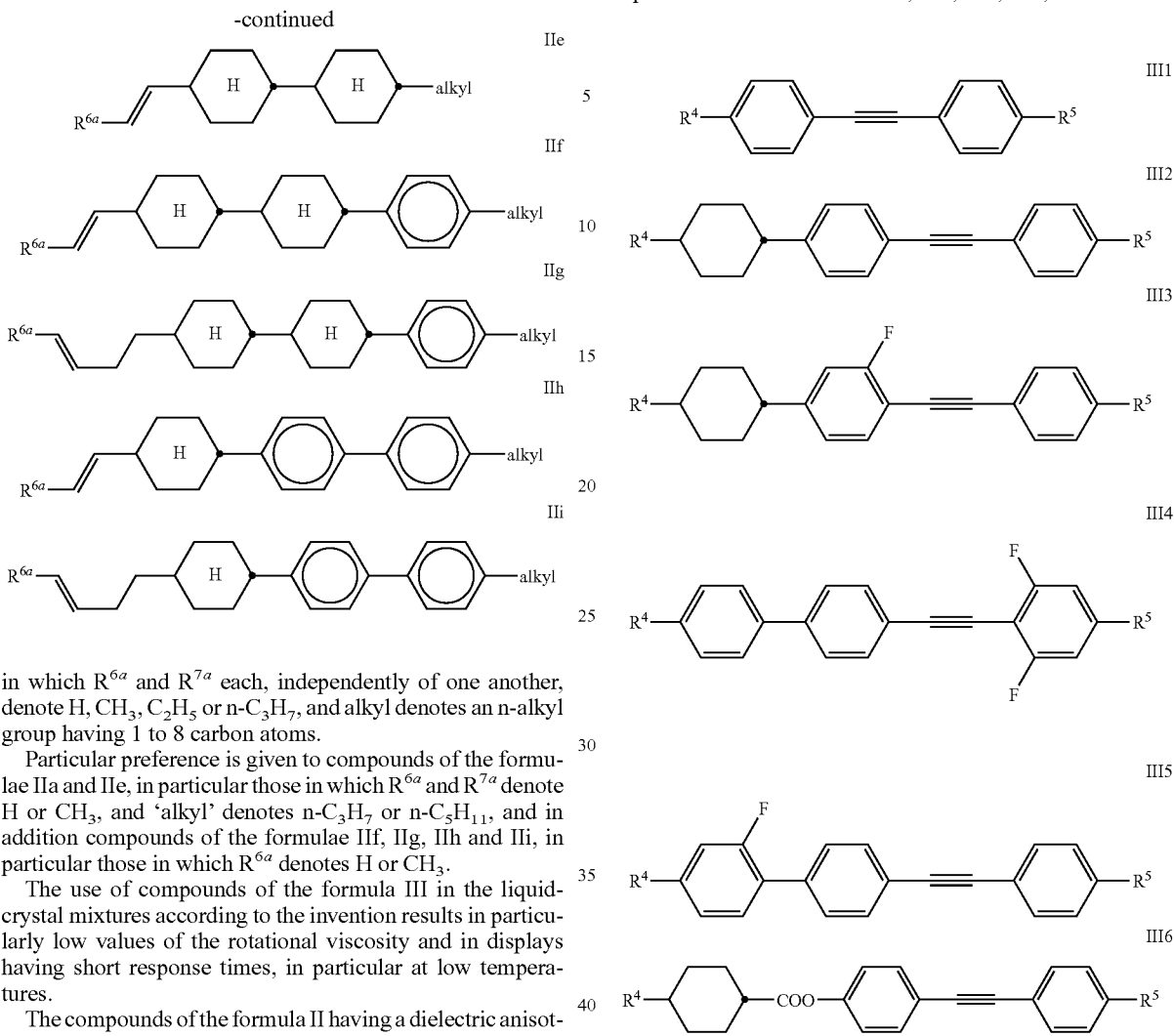

in which $R^{6a}$ and $R^{7a}$ each, independently of one another, denote H, $CH_3$, $C_2H_5$ or n-$C_3H_7$, and alkyl denotes an n-alkyl group having 1 to 8 carbon atoms.

Particular preference is given to compounds of the formulae IIa and IIe, in particular those in which $R^{6a}$ and $R^{7a}$ denote H or $CH_3$, and 'alkyl' denotes n-$C_3H_7$ or n-$C_5H_{11}$, and in addition compounds of the formulae IIf, IIg, IIh and IIi, in particular those in which $R^{6a}$ denotes H or $CH_3$.

The use of compounds of the formula III in the liquid-crystal mixtures according to the invention results in particularly low values of the rotational viscosity and in displays having short response times, in particular at low temperatures.

The compounds of the formula II having a dielectric anisotropy of −1.5 to +1.5 (dielectrically neutral compounds) should be classified in component B defined above.

Besides or alternatively to the dielectrically neutral alkenyl compounds of the formula II, the mixtures according to the invention preferably comprise one or more tolan compounds of the formula III

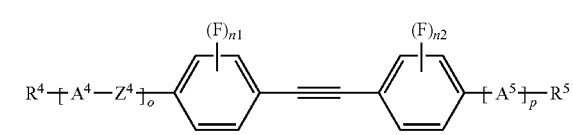

in particular of the formulae III1, III2, III3, III4, III5 and III6:

in which $R^4$ and $R^5$, independently of one another, are as defined above for $R^1$, and the rings A and A
  independently of one another, denote 1,4-phenylene or trans-1,4-cyclohexylene,
  $Z^4$ denotes a single bond, —O(CO), —(CO)O— or —C≡C—,
  o, p, n1 and n2, independently of one another, denote 0, 1 or 2.

The tolan compounds of the formulae III1 to III6 include, in particular, the compounds of the formulae:

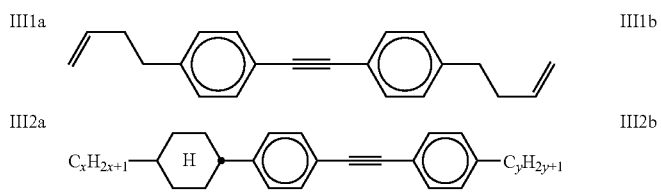

-continued

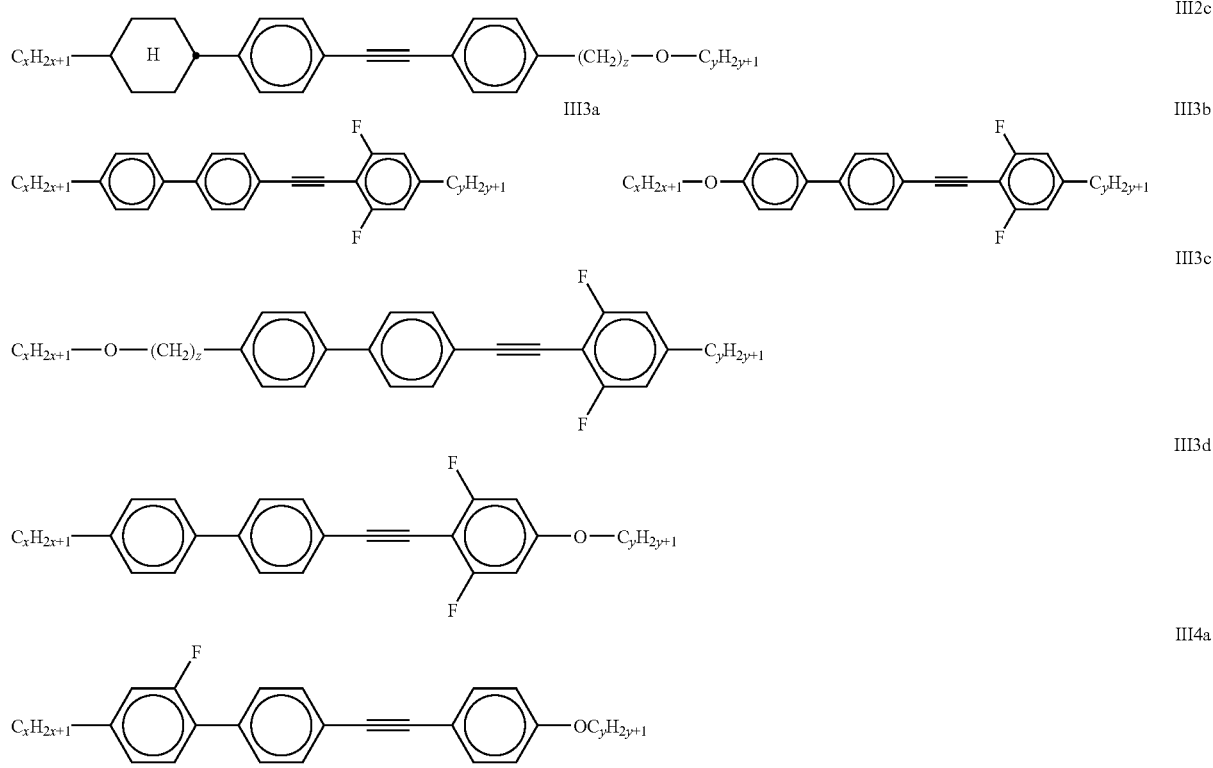

in which x and y each denote 1 to 10, where x+y≦10, and z denotes 1 to 5.

Of these, particular preference is given to the compounds of the formulae III2a and III3a, very particularly III3a, where x and y in the formulae each denote in particular, independently, 1, 2 or 3.

Besides or alternatively to the dielectrically neutral alkenyl compounds of the formula II, the mixtures according to the invention preferably comprise one or more dielectrically positive alkenyl compounds of the formula IV

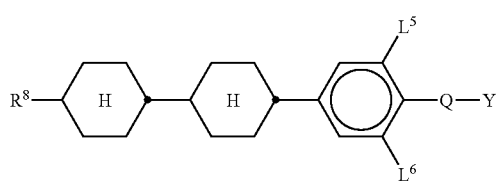

in which
R$^8$ denotes an alkenyl radical having 2 to 7 carbon atoms;
Q denotes $CF_2$, $OCF_2$, CFH, OCFH or a single bond;
Y denotes F, $CF_3$ or Cl; and
L$^5$ and L$^6$ each, independently of one another, denote H or F.

Preferred compounds of the formula IV are those in which L$^5$ and/or L$^6$ denote F and 'Q-Y' denotes F or $OCF_3$.

Preference is furthermore given to compounds of the formula IV in which R$^8$ denotes 1E-n-alkenyl or 3E-n-alkenyl having 2 to 7, in particular 2, 3 or 4, carbon atoms.

Particular preference is given to compounds of the formula IVa

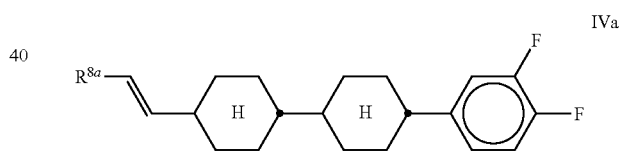

in which R$^{8a}$ denotes H, $CH_3$, $C_2H_5$ or n-$C_3H_7$, in particular H or $CH_3$.

The polar compounds of the formulae IV and IVa having a dielectric anisotropy of greater than +1.5 should be classified in component A defined above.

Component A preferably comprises one or more cyano compounds selected from the following formulae Va to Vi (generally V):

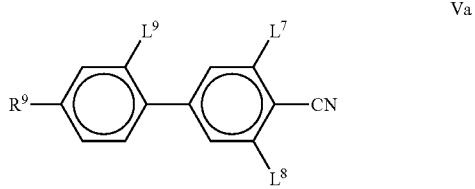

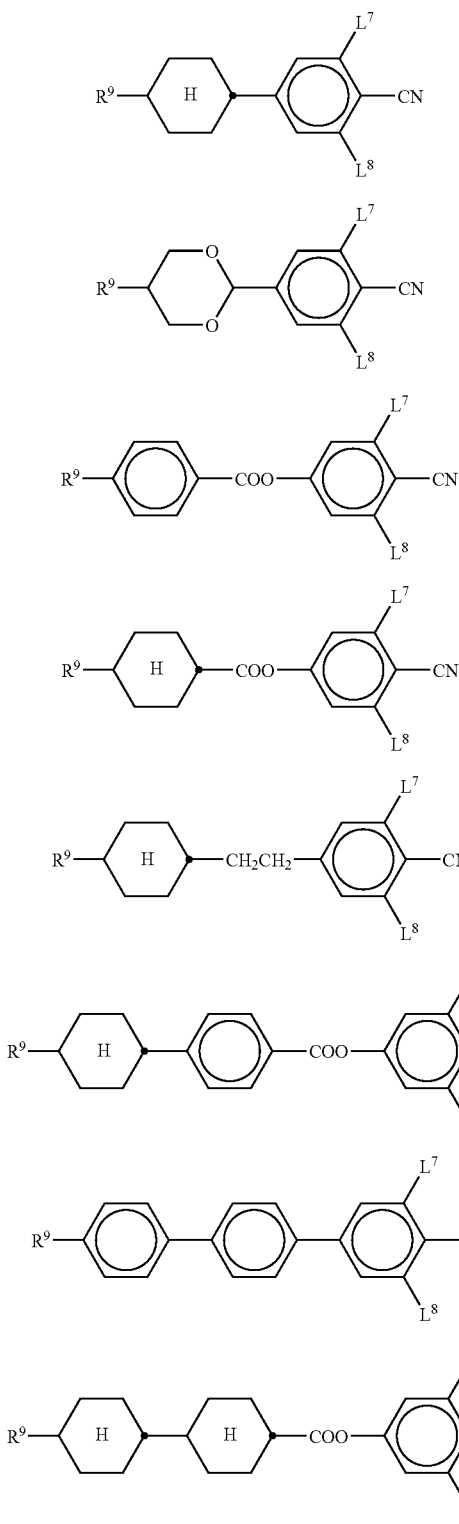

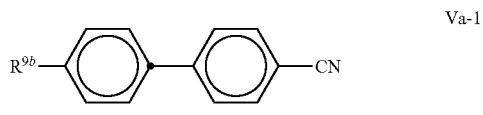
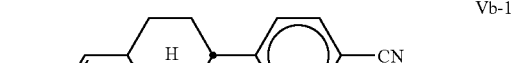
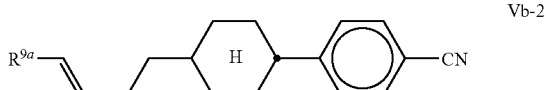
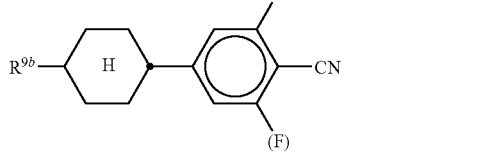
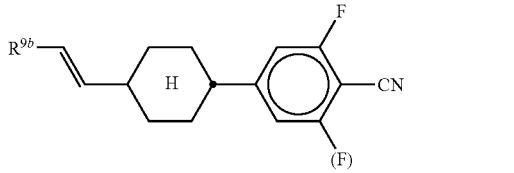
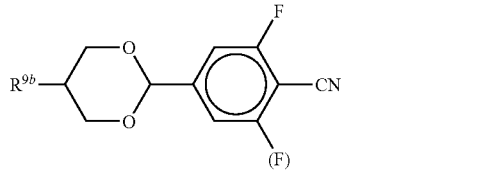

in which
R$^9$ denotes an alkyl or alkoxy radical having 1 to 12 carbon atoms or an alkenyl radical having 2 to 12 carbon atoms, where, in addition, one or more CH$_2$ groups in these radicals may be replaced by —O—, —S—, —C≡C—, —CO—, —O(CO)— or —(CO)O— in such a way that heteroatoms (O, S) are not linked directly to one another; and L$^7$, L$^8$ and L$^9$ each, independently of one another, denote H or F.

R$^9$ in these compounds particularly preferably denotes alkyl or alkoxy having 1 to 8 C atoms or alkenyl having 2 to 7 C atoms.

Particular preference is given to mixtures comprising one or more compounds of the formulae Va, Vb and/or Vc, furthermore Vd, in particular those in which L$^7$ and L$^8$ both denote H or F.

Very particular preference is given to mixtures which comprise one or more compounds of the formula Vb in which R$^9$ denotes alkenyl having 2 to 7 C atoms and L$^7$ and L$^8$ denote H or F, in particular both denote H, and/or of the formula Vc in which R$^9$ denotes alkyl having 1 to 7 carbon atoms or alkenyl having 2 to 7 carbon atoms and L$^7$ and L$^8$, independently of one another, denote H or F, where, in particular, at least one of the substituents L$^7$ and L$^8$ denotes F.

Of these, particular preference is given to compounds of the following formulae:

-continued

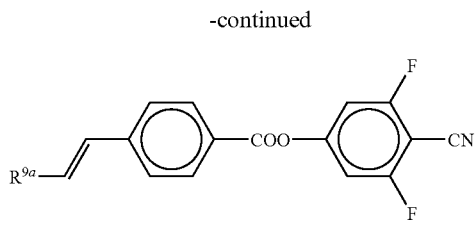
Vd-1

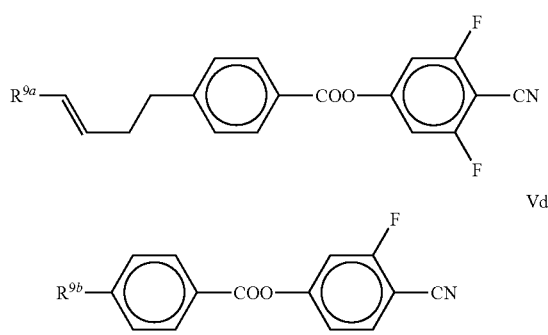
Vd-2

Vd-3 where
R$^{9a}$ denotes H, CH$_3$, C$_2$H$_5$ or n-C$_3$H$_7$,
in formulae Vb-1 and Vb-2 preferably H or CH$_3$,
in formulae Vd-1 and Vd-2 preferably H or C$_2$H$_5$, and
R$^{9b}$ denotes CH$_3$, C$_2$H$_5$, n-C$_3$H$_7$, n-C$_4$H$_9$, n-C$_5$H$_{11}$, n-C$_6$H$_{13}$,
in formula Va-1 in particular C$_2$H$_5$ and C$_3$H$_5$,
in formulae Vb-3 and Vb-4 in particular C$_2$H$_5$, n-C$_3$H$_7$, n-C$_4$H$_9$,
n-C$_5$H$_{11}$,
and in formula Vd-3 in particular C$_2$H$_5$, n-C$_3$H$_7$, n-C$_4$H$_9$, n-C$_5$H$_{11}$.

Preference is furthermore given to mixtures which comprise one or more compounds of the formula Vh in which L$^8$ denotes H and L$^7$ denotes H or F, in particular F.

The individual compounds of the formulae II, III, IV, V, VI and VII and the sub-formulae thereof and also other compounds which can be used in the mixtures according to the invention are either known or can be prepared analogously to known compounds.

For some of the current displays of the active-matrix type (for example thin-film transistor, TFT), compounds of the formula V are in practice less suitable. Media according to the invention, particularly for active-matrix displays, therefore comprise one or more of the likewise high-polarity compounds of the formulae VIA and VIB:

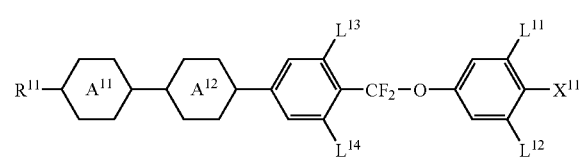
VIA

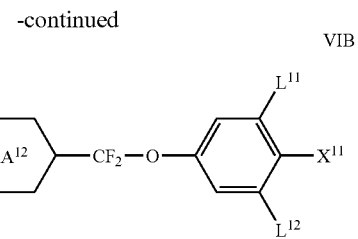
VIB in which
R$^{11}$ in each case, independently of one another, denotes alkyl, alkoxy or fluorinated alkyl or alkoxy having 1 to 7 C atoms, alkenyl, alkenyloxy, alkoxyalkyl or fluorinated alkenyl having 2 to 7 C atoms, preferably alkyl or alkenyl,
rings A$^{11}$ and A$^{12}$ each, independently of one another, denote

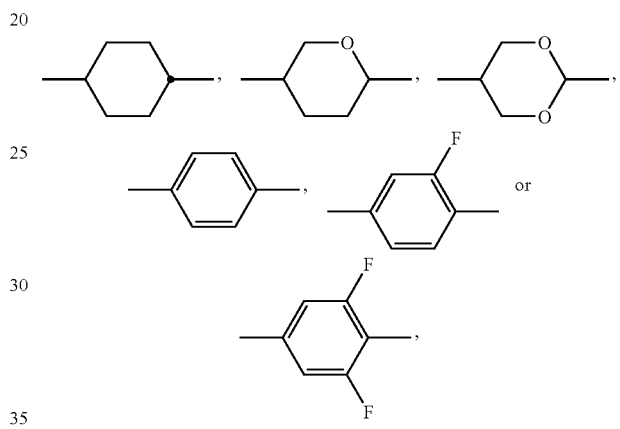

L$^{11}$, L$^{12}$, L$^{13}$, L$^{14}$ each, independently of one another, denote H or F, in particular F,
X$^{11}$, independently of one another, denotes halogen, halogenated alkoxy or alkyl having 1 to 3 C atoms or halogenated alkenyl or alkenyloxy having 2 to 3 C atoms, in particular F, Cl, —OCF$_3$ or —CF$_3$, particularly preferably F, Cl or —OCF$_3$.

Particular preference is given to mixtures according to the invention which comprise one or more compounds of the formulae VII1, VII2 and VII3 (generally VII)

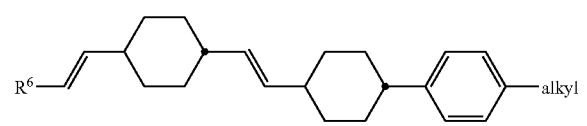
VII1

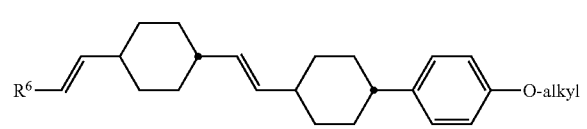
VII2

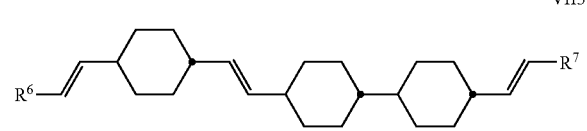
VII3 in which $R^6$, $R^7$ each, independently of one another, denote H, $CH_3$, $C_2H_5$, n-$C_3H_7$, n-$C_4H_9$ or n-$C_5H_{11}$, and 'alkyl' denotes an alkyl group having 1 to 8 carbon atoms.

The compounds of the formulae VII1, VII2 and VII3 having a dielectric anisotropy of −1.5 to +1.5 (dielectrically neutral compounds) should be classified in component B defined above.

Preferred liquid-crystal mixtures comprise one or more compounds of component A, preferably in a proportion of 15 to 99%, particularly preferably 20 to 97% and in particular 25 to 35%. These compounds preferably have a dielectric anisotropy $\Delta\varepsilon \geq +3$, particularly preferably $\Delta\varepsilon \geq +8$ and in particular $\Delta\varepsilon \geq +12$.

Preferred liquid-crystal mixtures comprise one or more compounds of component B, preferably 3 to 80%, particularly preferably 3 to 75% and in particular 3 to 65%. The compounds from group B are distinguished, in particular, by their low values for the rotational viscosity $\gamma_1$.

Further preferred mixtures comprise one or more, in particular one or two, compounds of the formula I, one or more, in particular one or two, compounds of the formula II, one or more, in particular one or two, compounds of the formula III, and/or one or more, in particular one or two, compounds of the formula IV.

The mixtures according to the invention can optionally also comprise up to 20% of one or more compounds having a dielectric anisotropy of <−1.5 (component C).

If the mixtures comprise compounds of component C, these are preferably one or more compounds containing the structural element 2,3-difluoro-1,4-phenylene, such as, for example, compounds in accordance with DE-A 38 07 801, DE-A 38 07 861, DE-A 38 07 863, DE-A 38 07 864 and DE-A 38 07 908. Particular preference is given to tolans containing this structural element in accordance with WO 88/07514.

However, the liquid-crystal mixtures according to the invention preferably comprise no compounds of component C.

The liquid-crystalline mixtures optionally comprise an optically active component D in such an amount that the ratio between the layer thickness (separation of the outer plates) and the natural pitch of the chiral nematic liquid-crystal mixture is greater than 0, preferably greater than 0.2. A multiplicity of chiral dopants, some of which are commercially available, such as, for example, cholesteryl nonanoate (CN), S-811, S-1011, S-2011 and CB15 from Merck KGaA, Darmstadt, is available to the person skilled in the art for the component. The choice of dopants is not crucial per se.

The proportion of the compounds of component D is preferably 0 to 10%, particularly preferably 0 to 5% and in particular 0 to 3%.

Further preferred embodiments relate to liquid-crystal mixtures according to the invention having the following specifications:

The proportion of the compounds of the formula I is preferably 2 to 30%, particularly preferably 4 to 20% and very particularly preferably 6 to 15%.

The proportion of the compounds of the formula II together is preferably 5 to 60%, particularly preferably 10 to 50% and very particularly preferably 20 to 45%.

The proportion of the compounds of the formula III is preferably 0 to 40% and particularly preferably 10 to 35%.

The proportion of the compounds of the formula IV is preferably 0 to 30% and particularly preferably 2 to 15% and very particularly preferably 3 to 10%.

The mixtures preferably comprise 1-25% by weight, in particular 2-15% by weight, of compounds selected from the formulae VII1, VII2 and VII3.

The term "alkyl" encompasses straight-chain and branched alkyl groups having 1-9 carbon atoms, in particular the straight-chain groups methyl, ethyl, propyl, butyl, pentyl, hexyl and heptyl. Groups having 2-5 carbon atoms are generally preferred.

The term "alkenyl" in the definition of $R^1$, $R^2$, $R^3$, $R^4$, $R^5$, $R^8$ and $R^9$ encompasses straight-chain and branched alkenyl groups, but preferably the straight-chain groups. Particularly preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl and 6-heptenyl. Groups having up to 5 carbon atoms are generally preferred.

Halogen denotes fluorine, chlorine, bromine or iodine. Of these, preferred end groups are fluorine and chlorine, in particular fluorine.

The mixtures according to the invention are distinguished, in particular on use in TN and STN displays of high layer thicknesses, by very low total response times ($t_{sum} = t_{on} + t_{off}$). They are particularly suitable for use as STN mixtures in STN displays.

The liquid-crystal mixtures used in the TN and STN cells according to the invention are preferably dielectrically positive, with $\Delta\varepsilon \geq 3$. Particular preference is given to liquid-crystal mixtures with $\Delta\varepsilon \geq 5$ and in particular with $\Delta\varepsilon \geq 8$.

The liquid-crystal mixtures according to the invention have favourable combinations of the values for the threshold voltage $V_{10}$ and for the rotational viscosity $\gamma_1$. If the value for the optical path difference d·$\Delta$n is pre-specified, the value for the layer thickness d is determined by the optical anisotropy $\Delta$n. In particular at relatively high values for d·$\Delta$n, the use of liquid-crystal mixtures according to the invention having a relatively high value for the optical anisotropy is generally preferred, since the value for d can then be selected to be relatively small, which results in more favourable values for the response times. However, liquid-crystal displays according to the invention which contain liquid-crystal mixtures according to the invention with smaller values for $\Delta$n are also characterised by advantageous values for the response times.

The liquid-crystal mixtures according to the invention are furthermore characterised by advantageous values for the steepness of the electro-optical characteristic line, and can be operated with high multiplex rates, in particular at temperatures above 20° C. In addition, the liquid-crystal mixtures according to the invention have high stability and favourable values for the electrical resistance and the frequency dependence of the threshold voltage. The frequency dependence of the threshold voltage is determined by measurement of the threshold voltage at different frequencies, especially at 20 kHz and at 80 Hz, in particular also at low temperatures, for example at −20° C. The difference gives the measurement value $\Delta V_{10}(f)$. The liquid-crystal displays according to the invention have a large working-temperature range and good angle dependence of the contrast.

The construction of the liquid-crystal display elements according to the invention from polarisers, electrode base plates and electrodes having a surface treatment such that the preferential alignment (director) of the liquid-crystal molecules in each case adjacent thereto is usually twisted by a value of from 160° to 600° from one electrode to the other corresponds to the usual structure for display elements of this type. The term "usual structure" here is broadly drawn and also covers all derivatives and modifications of the STN cell, in particular also matrix display elements and display elements containing additional magnets.

The surface tilt angle at the two outer plates may be identical or different. Identical tilt angles are preferred. In the STN displays, the pre-tilt angle is 1° to 30°, preferably 1° to 12° and particularly preferably 3° to 10°. Preferred TN displays have pre-tilt angles between the longitudinal axis of the molecules at the surface of the outer plates and the outer plates of from 0° to 7°, preferably from 0.01° to 5° and particularly preferably from 0.1° to 2°.

The twist angle of the STN mixture in the cell from alignment layer to alignment layer has a value of between 100° and 600°, preferably between 170° and 300° and particularly preferably between 180° and 270°. The twist angle of the TN mixture in the cell has a value of between 22.5° and 170°, preferably between 45° and 130° and particularly preferably between 80° and 115°.

The liquid-crystal mixtures according to the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The invention therefore furthermore relates to a process for the preparation of a liquid-crystal mixture as described above which is characterised in that the compound(s) of the formula I is (are) mixed with further liquid-crystalline co-components, and additives are optionally added.

The dielectrics may also comprise further additives which are known to the person skilled in the art and are described in the literature. For example, 0 to 15% of plethoric dyes can be added.

In the present application and in the examples below, the structures of the liquid-crystal compounds are indicated by means of acronyms, the trans-formation into chemical formulae taking place in accordance with Tables A and B below. All radicals $C_nH_{2n+1}$ and $C_mH_{2m+1}$ are straight-chain alkyl radicals having n and m C atoms respectively. The alkenyl radicals have the trans-configuration. The coding in Table B is self-evident. In Table A, only the acronym for the parent structure is indicated. In individual cases, the acronym for the parent structure is followed, separated by a dash, by the code indicated in the table below for the substituents $R^1$, $R^2$, $L^1$, $L^2$ and $L^3$.

The liquid-crystal displays preferably contain liquid-crystalline mixtures which are composed of one or more compounds of the formula I and one or more compounds from Tables A and B.

| Code for $R^1$, $R^2$, $L^1$, $L^2$, $L^3$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nO•m | $OC_nH_{2n+1}$ | $C_mH_{2m+1}$ | H | H | H |
| nOm | $C_nH_{2n+1}$ | $OC_mH_{2m+1}$ | H | H | H |
| n | $C_nH_{2n+1}$ | CN | H | H | H |
| nN•F | $C_nH_{2n+1}$ | CN | H | H | F |
| nN•F•F | $C_nH_{2n+1}$ | CN | H | F | F |
| nF | $C_nH_{2n+1}$ | F | H | H | H |
| nOF | $OC_nH_{2n+1}$ | F | H | H | H |
| nF•F | $C_nH_{2n+1}$ | F | H | H | F |
| nmF | $C_nH_{2n+1}$ | $C_mH_{2m+1}$ | F | H | H |
| nOCF₃ | $C_nH_{2n+1}$ | OCF₃ | H | H | H |
| n-Vm | $C_nH_{2n+1}$ | —CH=CH—$C_mH_{2m+1}$ | H | H | H |
| nV-Vm | $C_nH_{2n+1}$—CH=CH— | —CH=CH—$C_mH_{2m+1}$ | H | H | H |

TABLE A

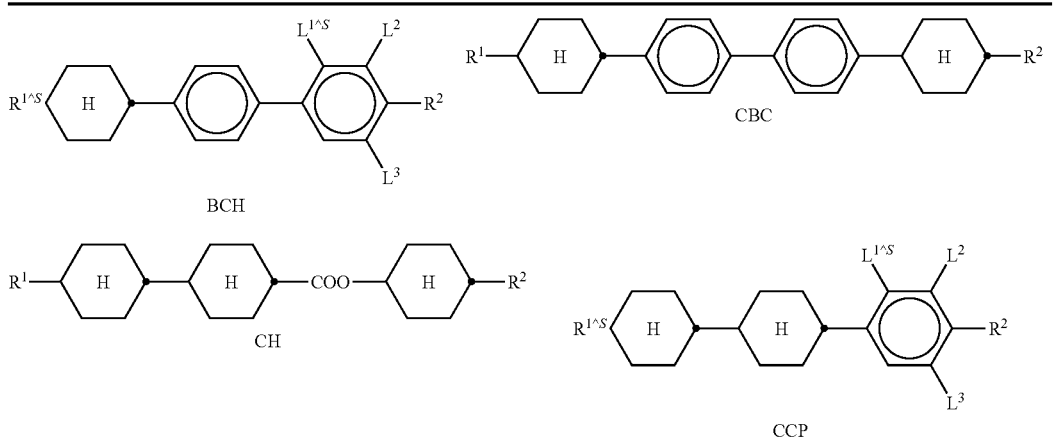

TABLE A-continued
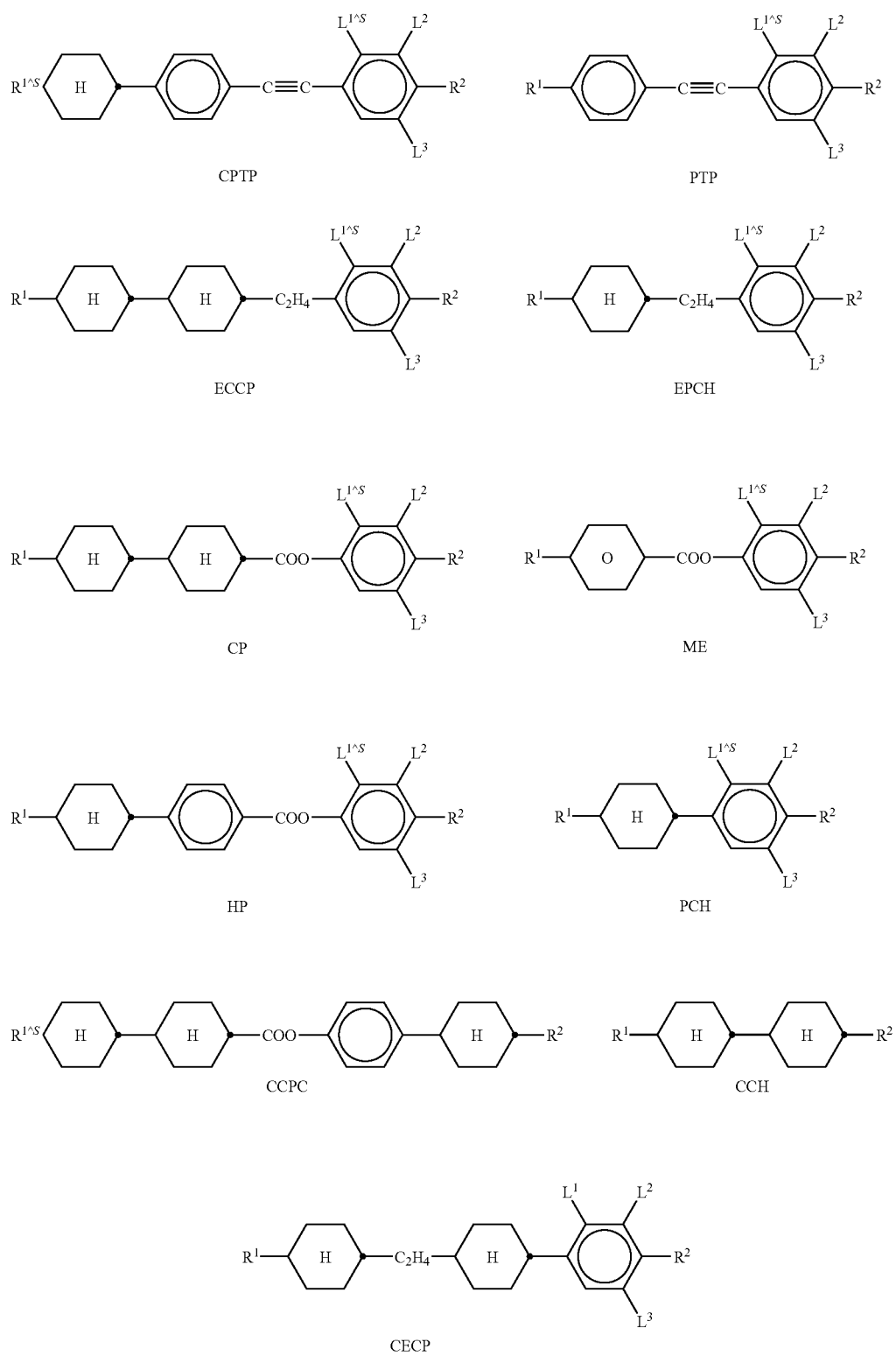
($L^1, L^2, L^3$ = H or F)

TABLE B
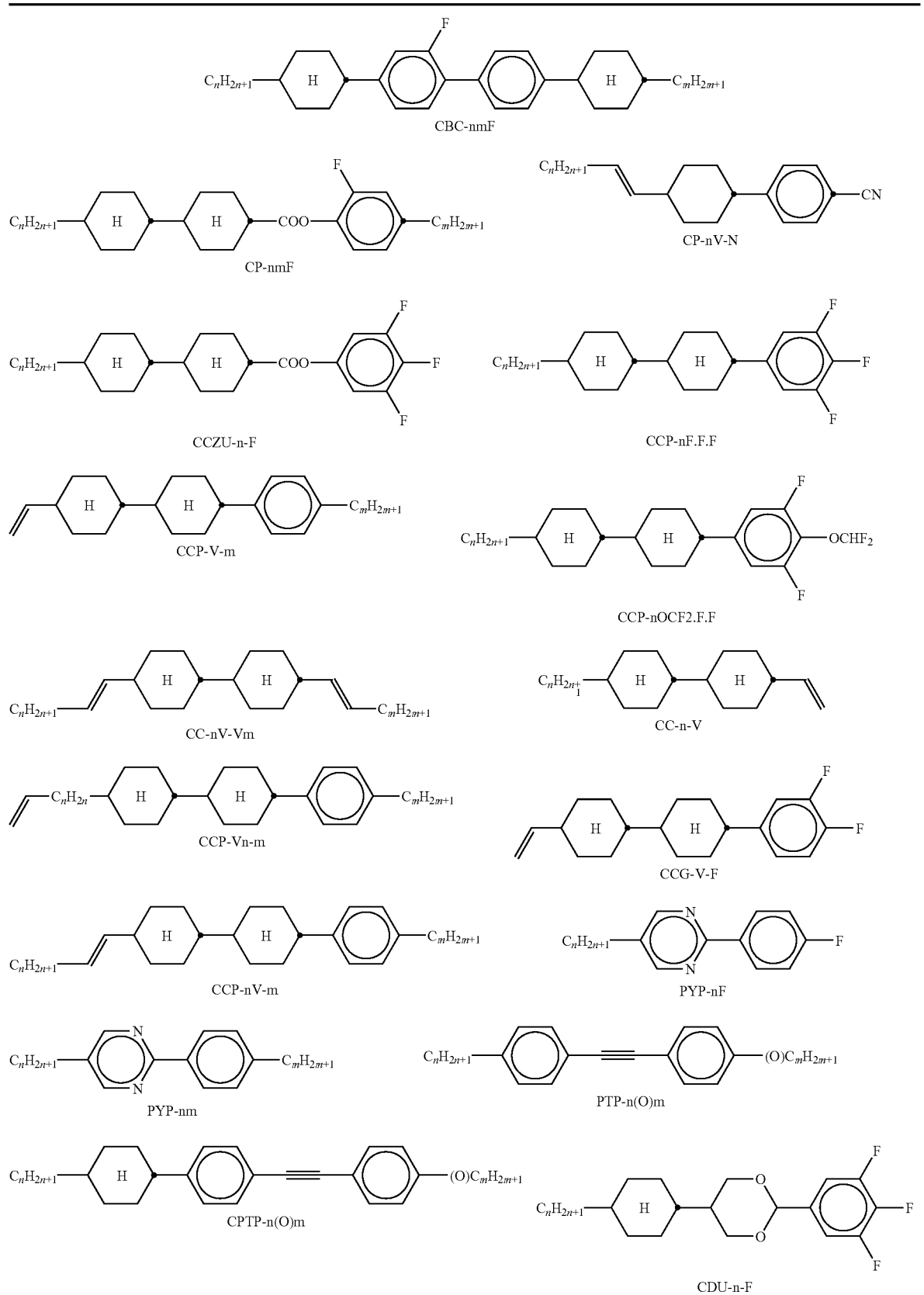

TABLE B-continued
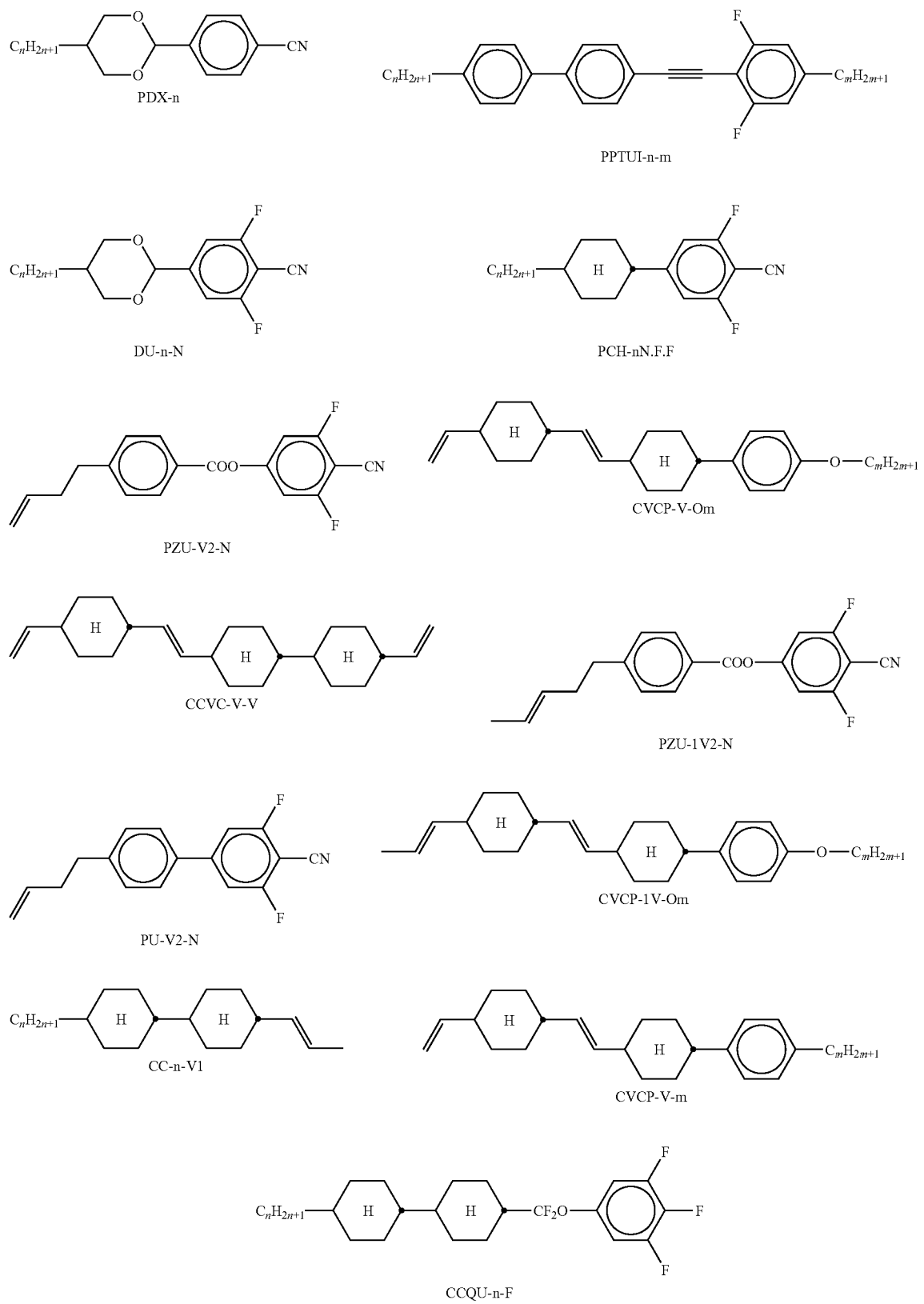

TABLE B-continued
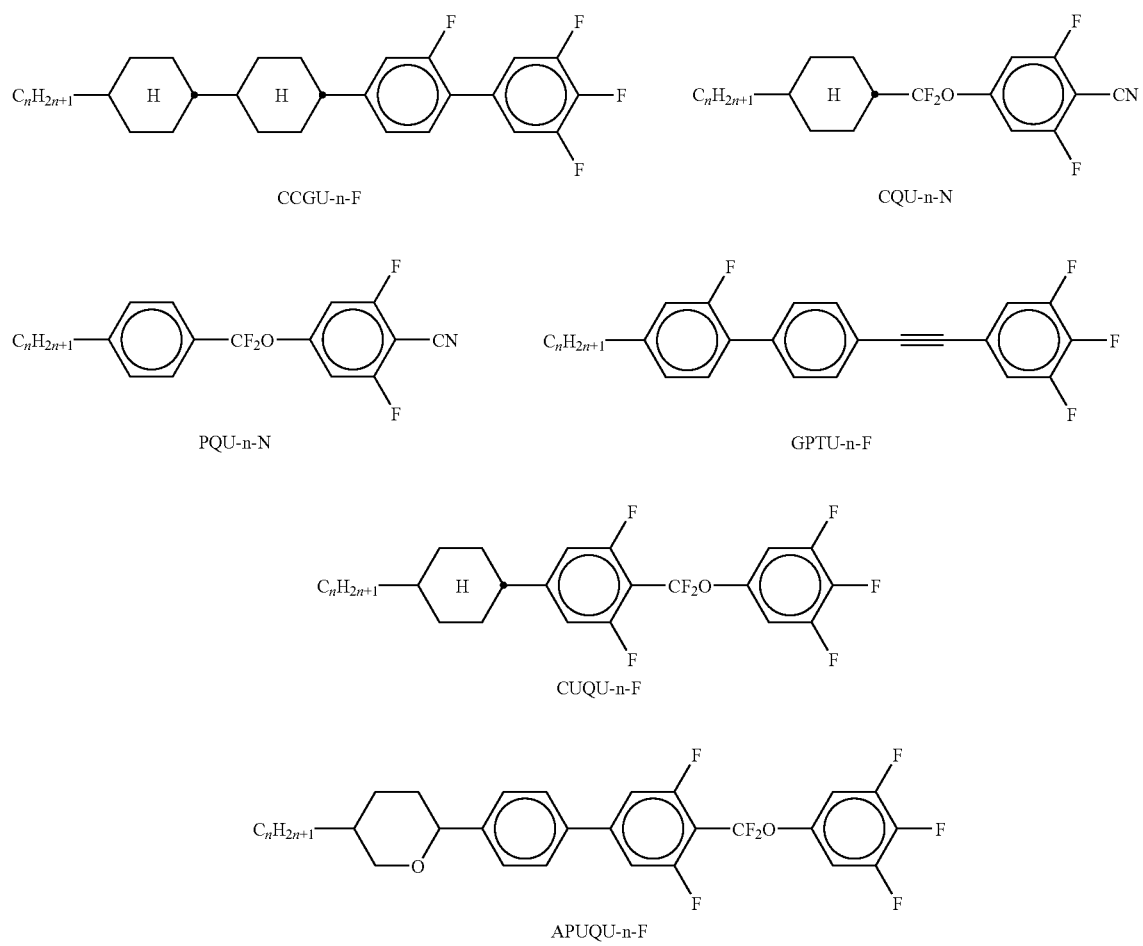
TABLE C
Table C shows possible dopants which are preferably added to the mixtures according to the invention.
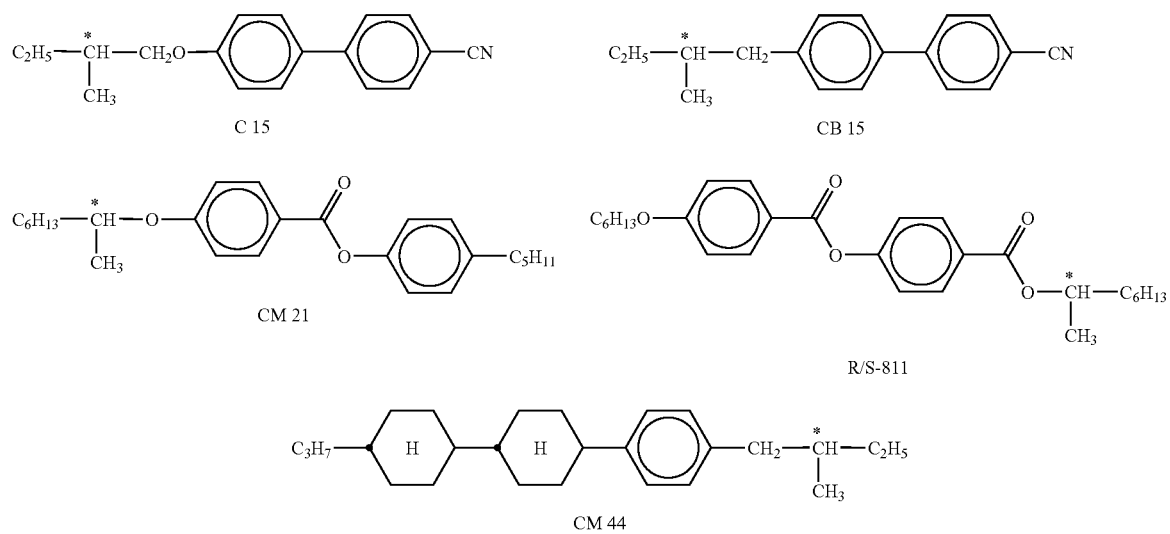

TABLE C-continued

Table C shows possible dopants which are preferably added to the mixtures according to the invention.

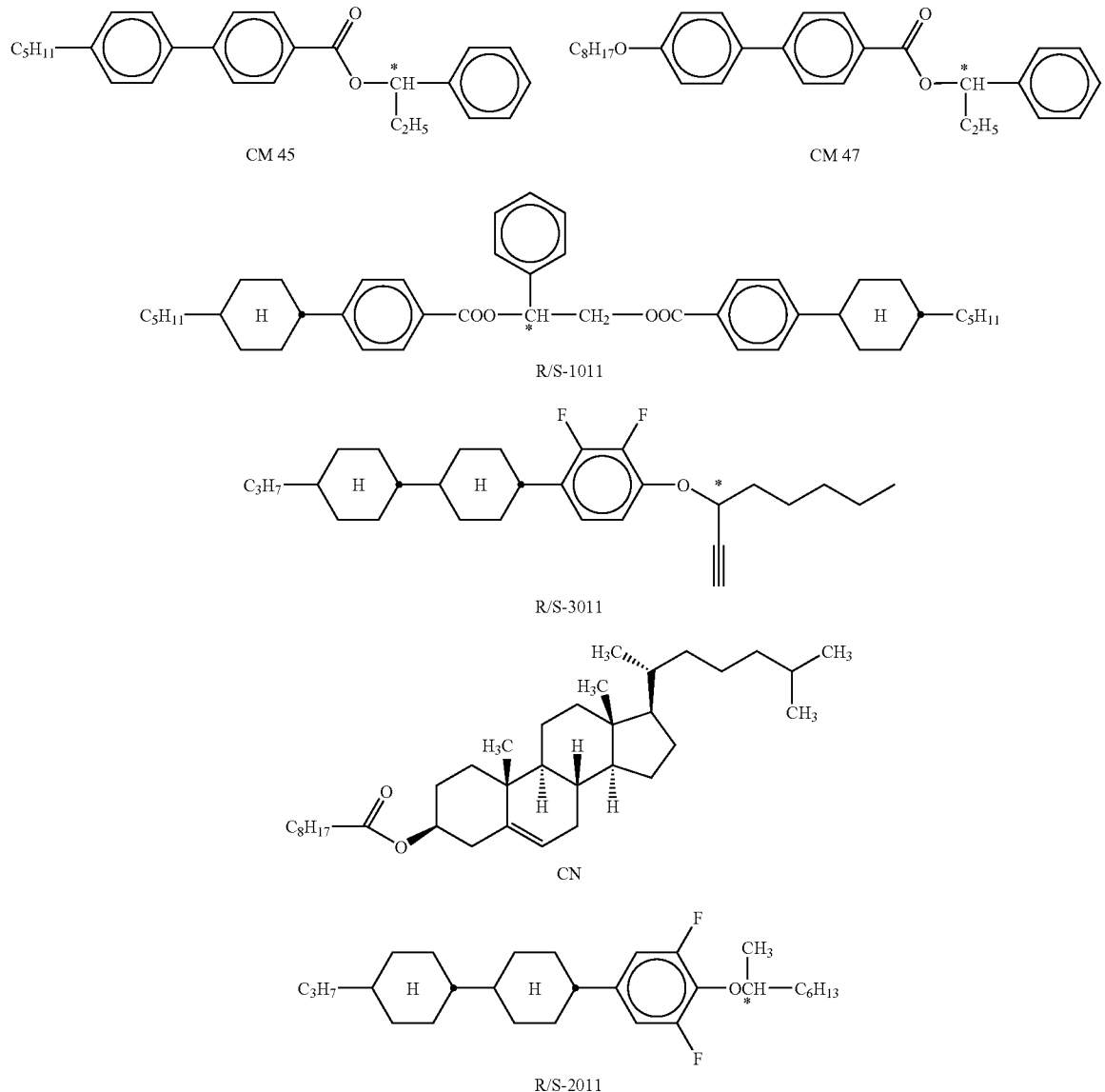

The following examples explain the invention without being intended to restrict it. The following abbreviations are used:

| | |
|---|---|
| m.p. | melting point, |
| cl.p. | clearing point (nematic-isotropic phase-transition temperature), |
| $\Delta n$ | optical anisotropy (589 nm, 20° C.), |
| $\Delta \epsilon$ | dielectric anisotropy (1 kHz, 20° C.), |
| $\epsilon_{\parallel}$ | component of the dielectric constant parallel to the longitudinal molecular axis (1 kHz, 20° C.), |
| $\epsilon_{\perp}$ | component of the dielectric constant perpendicular to the longitudinal molecular axis (1 kHz, 20° C.) |
| $\gamma_1$ | rotational viscosity (20° C.), |
| $t_{store}$ | low-temperature storage stability in hours (−20° C., −30° C., −40° C.), |
| steepness | characteristic-line steepness = $(V_{90}/V_{10} - 1)*100$, in %, |
| $V_{10}$ | threshold voltage = characteristic voltage at a relative contrast of 10%, |
| $V_{90}$ | saturation voltage = characteristic voltage at a relative contrast of 90%, |
| $\Delta V_{10}(f)$ | frequency dependence of the threshold voltage $V_{10}$ between 80 Hz and 20 kHz at −20° C., |
| $t_{on}$ | time from switching on until 90% of the maximum contrast is reached, |
| $t_{off}$ | time from switching off until 10% of the maximum contrast is reached, |
| $t_{sum}$ | $t_{on} + t_{off}$ (at refresh rate of 80 Hz), |
| MR | multiplex rate (duty), |
| d/P | layer thickness divided by pitch, |
| B | bias, |
| $V_0$ | capacitive threshold voltage (1 kHz, 20° C.). |

Besides the usual and well-known abbreviations, the following abbreviations are used:

C: crystalline phase; N: nematic phase; I: isotropic phase, Sm: smectic phase.

The physical, physicochemical and electro-optical parameters are determined by generally known methods, as described, inter alia, in the brochure "Merck Liquid Crystals—Licristal®—Physical Properties of Liquid Crystals—Description of the Measurement Methods", 1998, Merck KGaA, Darmstadt.

The dielectric anisotropy Δ∈ of the individual substances is determined at 20° C. and 1 kHz. To this end, 5-10% by weight of the substance to be investigated are measured as a solution in the dielectrically positive mixture ZLI-4792 (Merck KGaA), and the measurement value is extrapolated to a concentration of 100%. The optical anisotropy Δn is determined at 20° C. and a wavelength of 589.3 nm. It is likewise determined by linear extrapolation of the values.

Above and below, all temperatures are indicated in ° C. The percentages of the mixtures are percent by weight. All values for the measurement cell relate to 20° C., unless indicated otherwise. The twist of the test cell is 240°, left-handed rotation arrangement, unless indicated otherwise. For the measurement with doping, the above-mentioned compound S-811 is added.

EXAMPLES

Synthesis Example 1

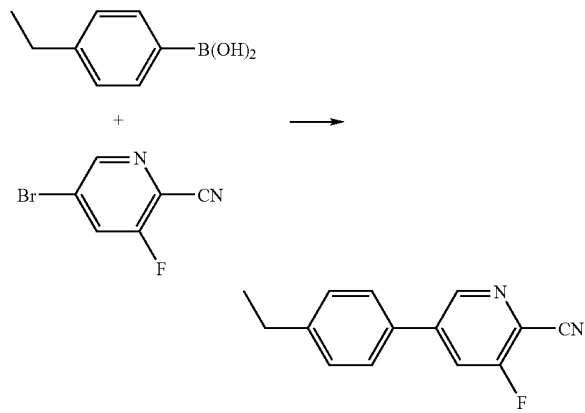

3.53 g (16.7 mmol) of the bromide, 30 ml of toluene and 6.0 g (57 mmol) of anhydrous sodium carbonate are initially introduced in 20 ml of water and warmed to 75° C. with vigorous stirring. 0.10 g (0.087 mmol) of tetrakis(triphenylphosphine)palladium and a warm solution of 4-ethylphenylboronic acid in 15 ml of ethanol are added. The reaction mixture is kept under reflux for 12 h, 10 ml of water are added, and the phases are separated. The aqueous phase is extracted with further toluene. After drying, evaporation and crystallisation from dichloromethane, colourless crystals (m.p. 108° C.) are obtained from the combined organic phases.

Δ∈=49, Δn=0.221.

The following are prepared analogously:

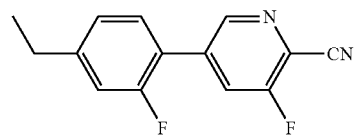

m.p. 60° C.; Δ∈=54; Δn=0.156.

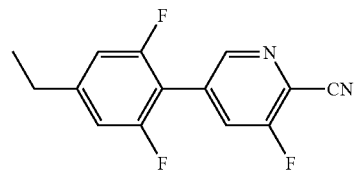

m.p. 55° C.; Δ∈=64; Δn=0.117.

Synthesis Example 2

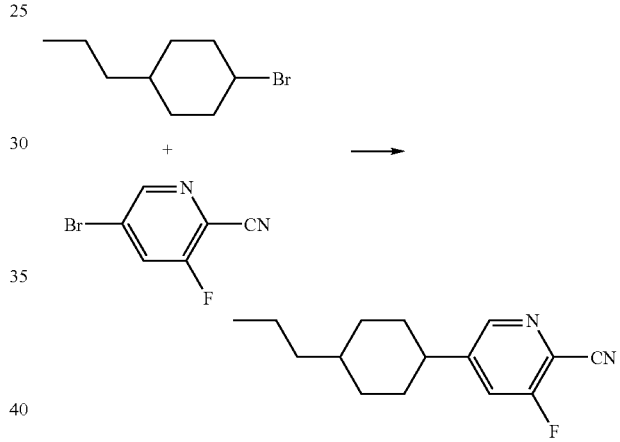

0.66 g (95 mmol) of lithium granules is added at 12° C. to a solution of 5.0 g (27 mmol) of 4-propylcyclohexyl bromide in 40 ml of toluene and 10 ml of dry THF and 5.4 g (24 mmol) of dry zinc bromide. After initiation of the reaction, the mixture is stirred under the influence of ultrasound (Bandelin Sonorex RK 510H, 450 W) for 4 h. The black suspension is filtered. 0.40 g (0.54 mmol) of palladium(II) chloride and 5.00 g (23.7 mmol) of pyridine bromide are added at 10° C. to half of the solution prepared. The temperature rises spontaneously and is kept at about 30° C. for 1 h by metered ice-cooling. NH$_4$Cl solution is added to the batch, which is filtered, and the phases are worked up by separation and extraction. The washed and dried organic phases are filtered through silica gel with dichloromethane and evaporated, and the product is recrystallised (m.p. 31° C.).

The following are prepared analogously:

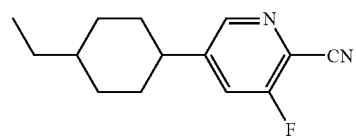

m.p. 13° C.; Δ∈=33; Δn=0.070.

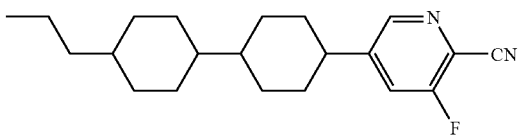

m.p. 63° C.
Phase properties (DSC): C 63 N 209 I.

Synthesis Example 3

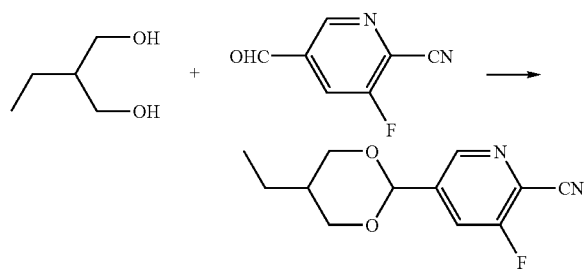

250 mg of toluenesulfonic acid monohydrate are added to 28 mmol of the diol and 28 mmol of the aldehyde in 50 ml of toluene, and the solution is heated at the boil on a water separator for 12 h. Filtration through silica gel, extraction with water, drying and crystallisation gives colourless crystals (m.p. 86° C.).

$\Delta\epsilon=56$; $\Delta n=0.074$

The following are prepared analogously:

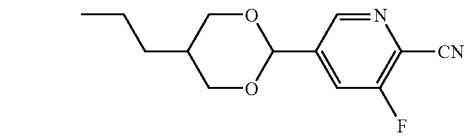

m.p. 74° C.; $\Delta\epsilon=54$; $\Delta n=0.072$.

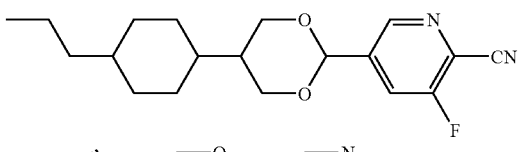

m.p. 91° C.

Mixture Example 1

| | |
|---|---|
| PZU-V2-N | 2% |
| CP-1V-N | 11.5% |
| DU-2-N | 4% |
| CC-3-V | 23% |
| CC-5-V | 5% |
| CCP-V2-1 | 1.5% |
| CVCP-V-1 | 5% |
| CVCP-1V-O1 | 5% |
| PPTUI-3-2 | 20% |
| PPTUI-3-4 | 13.5% |
| (structure) | 9.5% |
| | 100% |
| Cl.p. [° C.]: | 87 |
| Δn (589 nm): | 0.1754 |
| Δε | 10.1 |
| Δε/ε⊥ | 2.38 |
| γ₁: | 106 |
| V₁₀ [V]: | 1.90 |
| ΔV₁₀(f) [mV]: | 360 |
| t$_{sum}$ [ms] (25° C.): | 154 |
| Steepness (25° C.) | 6.6 |
| d · Δn [μm]: | 0.85 |
| Twist [°]: | 240 |
| MR: | 128 |
| B: | 12 |
| Refresh rate: | 80 Hz |
| d/P | 0.52–0.53 |

Mixture Example 2

| | |
|---|---|
| PZU-V2-N | 4% |
| CP-1V-N | 8% |
| DU-2-N | 7% |
| CC-3-V | 16% |
| CC-5-V | 8% |
| CCG-V-F | 5% |
| CCP-V-1 | 9% |
| CCP-V2-1 | 9.5% |
| CVCP-V-O1 | 3% |
| CVCP-1V-O1 | 3% |
| PPTUI-3-2 | 15.5% |
| (structure) | 12% |
| | 100% |
| Cl.p. [° C.]: | 79.5 |
| Δn (589 nm): | 0.1340 |
| Δε | 12.90 |
| Δε/ε⊥ | 2.56 |
| γ₁: | 94 |
| V₁₀ [V]: | 1.63 |
| ΔV₁₀(f) [mV]: | 314 |
| t$_{sum}$ [ms] (25° C.): | 271 |
| Steepness (25° C.) | 6.6 |
| d · Δn [μm]: | 0.85 |
| Twist [°]: | 240 |
| MR: | 128 |
| B: | 12 |
| Refresh rate: | 80 Hz |
| d/P | 0.52–0.53 |

Mixture Example 3

| | |
|---|---|
| PZU-V2-N | 3% |
| CP-1V-N | 9.75% |
| DU-2-N | 5.5% |
| CC-3-V | 19.5% |
| CC-5-V | 6.5% |
| CCG-V-F | 2.5% |
| CCP-V-1 | 4.5% |
| CCP-V2-1 | 5.5% |
| CVCP-V-1 | 2.5% |
| CVCP-V-O1 | 1.5% |
| CVCP-1V-O1 | 4% |
| PPTUI-3-2 | 17.75% |
| PPTUI-3-4 | 13.5% |
| 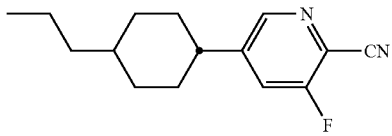 | 10.75% |
| | 100% |
| Cl.p. [° C.]: | 83.5 |
| Δn (589 nm): | 0.1545 |
| Δε | 11.4 |
| Δε/ε⊥ | 2.48 |
| $\gamma_1$: | 99 |
| $V_{10}$ [V]: | 1.77 |
| $t_{sum}$ [ms] (25° C.): | 207 |
| Steepness (25° C.) | 6.5 |
| d · Δn [μm]: | 0.85 |
| Twist [°]: | 240 |
| MR: | 128 |
| B: | 12 |
| Refresh rate: | 80 Hz |
| d/P | 0.52–0.53 |

Mixture Example 4

| | |
|---|---|
| PZU-V2-N | 4% |
| CP-1V-N | 8% |
| DU-2-N | 7% |
| CC-3-V | 16% |
| CC-5-V | 4% |
| CCG-V-F | 5% |
| CCP-V-1 | 11% |
| CCP-V2-1 | 12% |
| CVCP-V-O1 | 3% |
| CVCP-1V-O1 | 3% |
| PPTUI-3-2 | 15% |
| 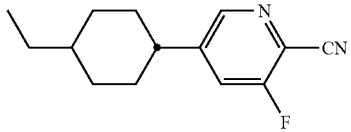 | 12% |
| | 100% |
| Cl.p. [° C.]: | 79 |
| Δn (589 nm): | 0.1328 |
| Δε | 12.9 |
| Δε/ε⊥ | 2.43 |
| $\gamma_1$: | 94 |
| $V_{10}$ [V]: | 1.61 |
| $\Delta V_{10}(f)$ [mV]: | 263 |
| $t_{sum}$ [ms] (25° C.): | 290 |
| Steepness (25° C.) | 6.4 |
| d · Δn [μm]: | 0.85 |
| Twist [°]: | 240 |

| | |
|---|---|
| MR: | 128 |
| B: | 12 |
| Refresh rate: | 80 Hz |
| d/P | 0.52–0.53 |

Mixture Example 5

| | |
|---|---|
| PZU-V2-N | 4% |
| CP-1V-N | 8% |
| CC-3-V | 23% |
| CC-5-V | 8% |
| CCG-V-F | 5% |
| CCP-V-1 | 9% |
| CCP-V2-1 | 9.5% |
| CVCP-V-O1 | 3% |
| CVCP-1V-O1 | 3% |
| PPTUI-3-2 | 15.5% |
| 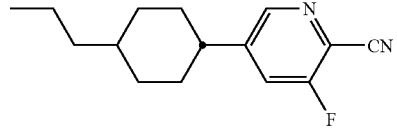 | 12% |
| | 100% |
| Cl.p. [° C.]: | 88.5 |
| Δn (589 nm): | 0.1332 |
| Δε | 8.6 |
| Δε/ε⊥ | 2.20 |
| $\gamma_1$: | 89 |
| $V_{10}$ [V]: | 2.09 |
| $\Delta V_{10}(f)$ [mV]: | 401 |
| $t_{sum}$ [ms] (25° C.): | 246.5 |
| Steepness (25° C.) | 5.3 |
| d · Δn [μm]: | 0.85 |
| Twist [°]: | 240 |
| MR: | 128 |
| B: | 12 |
| Refresh rate: | 80 Hz |
| d/P | 0.52–0.53 |

Mixture Example 6

| | |
|---|---|
| PZU-V2-N | 4% |
| PCH-2N.F.F | 12% |
| CP-1V-N | 6% |
| DU-2-N | 2% |
| CC-3-V | 16% |
| CCG-V-F | 10% |
| CCP-V-1 | 12% |
| CCP-V2-1 | 12% |
| CVCP-V-O1 | 3% |
| CVCP-1V-O1 | 3% |
| PPTUI-3-2 | 15% |
| 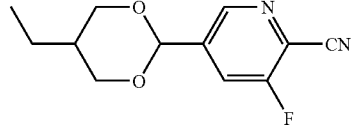 | 5% |
| | 100% |
| Cl.p. [° C.]: | 81 |
| Δn (589 nm): | 0.1330 |

-continued

| | |
|---|---|
| Δε | 13.1 |
| Δε/ε⊥ | 2.49 |
| $\gamma_1$: | 97 |
| $V_{10}$ [V]: | 1.52 |
| $\Delta V_{10}(f)$ [mV]: | 264 |
| $t_{sum}$ [ms] (25° C.): | 318 |
| Steepness (25° C.) | 6.1 |
| d · Δn [μm]: | 0.85 |
| Twist [°]: | 240 |
| MR: | 128 |
| B: | 12 |
| Refresh rate: | 80 Hz |
| d/P | 0.52–0.53 |

Mixture Example 7

| | |
|---|---|
| PZU-V2-N | 7.5% |
| CP-1V-N | 10% |
| CC-3-V | 34% |
| CCP-V-1 | 5% |
| CVCP-V-1 | 5% |
| CVCP-V-O1 | 5% |
| CVCP-1V-O1 | 5% |
| PPTUI-3-2 | 20% |
| PPTUI-3-4 | 3.5% |

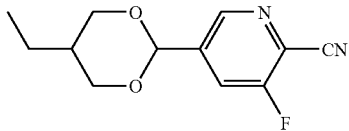 5%

| | |
|---|---|
| | 100% |
| Cl.p. [° C.]: | 88 |
| Δn (589 nm): | 0.1527 |
| Δε | 10.1 |
| Δε/ε⊥ | 2.47 |
| $\gamma_1$: | 89 |
| $V_{10}$ [V]: | 1.87 |
| $\Delta V_{10}(f)$ [mV]: | 487 |
| $t_{sum}$ [ms] (25° C.): | 171 |
| Steepness (25° C.) | 5.5 |
| d · Δn [μm]: | 0.85 |
| Twist [°]: | 240 |
| MR: | 128 |
| B: | 12 |
| Refresh rate: | 80 Hz |
| d/P | 0.52–0.53 |

Mixture Example 8

| | |
|---|---|
| BCH-3F.F | 10.8% |
| BCH-5F.F | 9% |
| ECCP-30CF3 | 4.5% |
| ECCP-50CF3 | 4.5% |
| CBC-33F | 1.8% |
| CBC-53F | 1.8% |
| CBC-55F | 1.8% |
| PCH-6F | 7.2% |
| PCH-7F | 5.4% |
| CCP-20CF3 | 7.2% |
| CCP-30CF3 | 10.8% |
| CCP-40CF3 | 6.3% |
| CCP-50CF3 | 9.9% |
| PCH-5F | 9% |

-continued

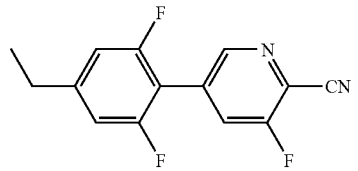 10%

| | |
|---|---|
| | 100% |
| Cl.p. [° C.]: | 77 |
| Δn (589 nm): | 0.1029 |
| Δε | 10.2 |
| Δε/ε⊥ | 2.3 |
| d · Δn [μm]: | 0.85 |
| Twist [°]: | 240 |
| MR: | 128 |
| B: | 12 |
| Refresh rate: | 80 Hz |
| d/P | 0.52–0.53 |

Mixture Example 9

| | |
|---|---|
| BCH-3F.F | 10.8 % |
| BCH-5F.F | 9% |
| ECCP-30CF3 | 4.5% |
| ECCP-50CF3 | 4.5% |
| CBC-33F | 1.8% |
| CBC-53F | 1.8% |
| CBC-55F | 1.8% |
| PCH-6F | 7.2% |
| PCH-7F | 5.4% |
| CCP-20CF3 | 7.2% |
| CCP-30CF3 | 10.8% |
| CCP-40CF3 | 6.3% |
| CCP-50CF3 | 9.9% |
| PCH-5F | 9% |

10%

| | |
|---|---|
| | 100% |
| Cl.p. [° C.]: | 75 |
| Δn (589 nm): | 0.0990 |
| Δε | 11.3 |
| Δε/ε⊥ | 2.45 |
| d · Δn [μm]: | 0.85 |
| Twist [°]: | 240 |
| MR: | 128 |
| B: | 12 |
| Refresh rate: | 80 Hz |
| d/P | 0.52–0.53 |

Mixture Example 10

| | |
|---|---|
| BCH-3F.F | 11.41% |
| BCH-5F.F | 9.51% |
| ECCP-30CF3 | 4.76% |
| ECCP-50CF3 | 4.76% |
| CBC-33F | 1.90% |
| CBC-53F | 1.90% |
| CBC-55F | 1.90% |
| PCH-6F | 7.61% |

-continued

| | |
|---|---|
| PCH-7F | 5.71% |
| CCP-20CF3 | 7.61% |
| CCP-30CF3 | 11.41% |
| CCP-40CF3 | 6.66% |
| CCP-50CF3 | 10.46% |
| PCH-5F | 9.51% |

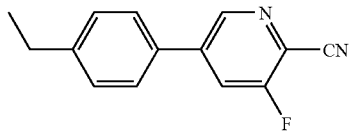

4.89%

| | |
|---|---|
| | 100% |
| Cl.p. [° C.]: | 86 |
| $\Delta n$ (589 nm): | 0.1014 |
| $\Delta \epsilon$ | 7.5 |
| $\Delta \epsilon / \epsilon_\perp$ | 2.09 |
| $d \cdot \Delta n$ [µm]: | 0.85 |
| Twist [°]: | 240 |
| MR: | 128 |
| B: | 12 |
| Refresh rate: | 80 Hz |
| d/P | 0.52-0.53 |

Mixture Example 11

| | |
|---|---|
| PZU-V2-N | 4% |
| PPTUI-3-2 | 15% |
| CP-1V-N | 6% |
| CC-3-V | 23% |
| CCG-V-F | 10% |
| CCP-V-1 | 12% |
| CCP-V2-1 | 12% |
| CVCP-V-O1 | 3% |
| CVCP-1V-O1 | 3% |

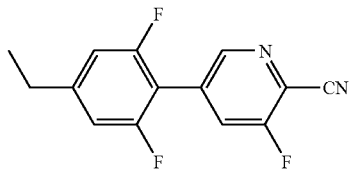

12%

| | |
|---|---|
| | 100% |
| Cl.p. [° C.]: | 89 |
| $\Delta n$ (589 nm): | 0.1397 |
| $\Delta \epsilon$ | 14.1 |
| $\Delta \epsilon / \epsilon_\perp$ | 2.97 |
| $\gamma_1$: | 98 |
| $V_{10}$ [V]: | 1.67 |
| $\Delta V_{10}(f)$ [mV]: | 254 |
| $t_{sum}$ [ms] (25° C.): | 211 |
| Steepness (25° C.) | 6.7 |
| $d \cdot \Delta n$ [µm]: | 0.85 |
| Twist [°]: | 240 |
| MR: | 128 |
| B: | 12 |
| Refresh rate: | 80 Hz |
| d/P | 0.52-0.53 |

Mixture Example 12

| | |
|---|---|
| CP-1V-N | 9% |
| CC-3-V | 22% |
| CC-5-V | 16% |
| CCP-V-1 | 9% |
| CCP-V2-1 | 4% |
| CVCP-V-1 | 5% |
| CVCP-V-O1 | 5% |
| CVCP-1V-O1 | 5% |
| PPTUI-3-2 | 15% |

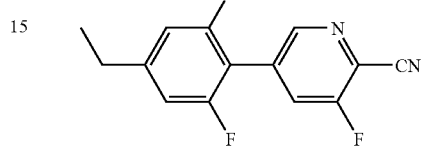

10%

| | |
|---|---|
| | 100% |
| Cl.p. [° C.]: | 87 |
| $\Delta n$ (589 nm): | 0.1310 |
| $\Delta \epsilon$ | 8.4 |
| $\Delta \epsilon / \epsilon_\perp$ | 2.08 |
| $\gamma_1$: | 83 |
| $V_{10}$ [V]: | 2.09 |
| $\Delta V_{10}(f)$ [mV]: | 159 |
| $t_{sum}$ [ms] (25° C.): | 228 |
| Steepness (25° C.) | 4.3 |
| $d \cdot \Delta n$ [µm]: | 0.85 |
| Twist [°]: | 240 |
| MR: | 128 |
| B: | 7 |
| Refresh rate: | 80 Hz |
| d/P | 0.52-0.53 |

The relaxation frequency is determined by measuring the dielectric constant parallel to the longitudinal molecular axis ($\epsilon_\parallel$) (−20° C.) at different frequencies in the range 1 to 1000 kHz. The relaxation frequency is the frequency of maximum $\epsilon_\parallel$. The measurement results are plotted in the drawing as squares (■). The maximum of the curve is above 100 kHz and is thus significantly above the maximum of the curve for Mixture Example 13.

Mixture Example 13 for Comparison

| | | | |
|---|---|---|---|
| PZU-V2-N | 3% | Cl.p. [° C.]: | 88.5 |
| DU-2-N | 7.5% | $\Delta n$ (589 nm): | 0.1299 |
| CP-1V-N | 12% | $\Delta \epsilon$ | 8.8 |
| CC-3-V | 20.5% | $\Delta \epsilon / \epsilon_\perp$ | 2.26 |
| CC-5-V | 11% | $\gamma_1$: | 90 |
| CCG-V-F | 6% | $V_{10}$ [V]: | 2.08 |
| CCP-V-1 | 10.5% | $\Delta V_{10}(f)$ [mV]: | 313 |
| CVCP-V-1 | 5% | $t_{sum}$ [ms] (25° C.): | 242 |
| CVCP-V-O1 | 5% | Steepness (25° C.) | 4.0 |
| CVCP-1V-O1 | 5% | $d \cdot \Delta n$ [µm]: | 0.85 |
| PPTUI-3-2 | 14.5% | Twist [°]: | 240 |
| | 100% | MR: | 128 |
| | | B: | 7 |
| | | Refresh rate: | 80 Hz |
| | | d/P | 0.52-0.53 |

This mixture is a comparative example for Mixture Example 12 with similar compounds and comparable properties.

The relaxation frequency is determined as in Mixture Example 12. The measurement results for $\epsilon_\parallel$ for different frequencies are plotted in the drawing as circles (●). The maximum of the curve is below 40 kHz and is thus significantly below the maximum of the curve for Mixture Example 12.

Mixture Example 14 for Comparison

| | | | |
|---|---|---|---|
| BCH-3F•F | 10.8% | Cl.p. [° C.]: | 77 |
| BCH-5F•F | 9% | Δn (589 nm): | 0.1036 |
| ECCP-30CF3 | 4.5% | Δε | 8.2 |
| ECCP-50CF3 | 4.5% | Δε/ε⊥ | 2.09 |
| CBC-33F | 1.8% | d · Δn [μm]: | 0.85 |
| CBC-53F | 1.8% | Twist [°]: | 240 |
| CBC-55F | 1.8% | MR: | 128 |
| PCH-6F | 7.2% | B: | 12 |
| PCH-7F | 5.4% | Refresh rate: | 80 Hz |
| CCP-20CF3 | 7.2% | d/P | 0.52-0.53 |
| CCP-30CF3 | 10.8% | | |
| CCP-40CF3 | 6.3% | | |
| CCP-50CF3 | 9.9% | | |
| PCH-5F | 9% | | |
| PU-V2-N | 10% | | |
| | 100% | | |

This mixture is a comparative example for Mixture Example 8 with similar compounds and comparable properties.

Mixture Example 15 for Comparison

| | | | |
|---|---|---|---|
| PZU-V2-N | 4% | Cl.p. [° C.]: | 79.5 |
| PPTUI-3-2 | 15% | Δn (589 nm): | 0.1320 |
| CP-1V-N | 6% | Δε | 12.6 |
| DU-2-N | 7% | Δε/ε⊥ | 2.41 |
| CC-3-V | 16% | γ₁: | 97 |
| CCG-V-F | 10% | V₁₀ [V]: | 1.59 |
| CCP-V-1 | 12% | ΔV₁₀(f) [mV]: | 283 |
| CCP-V2-1 | 12% | t_sum [ms] (25° C.): | 312 |
| CVCP-V-O1 | 3% | Steepness (25° C.) | 6.5 |
| CVCP-1V-O1 | 3% | d · Δn [μm]: | 0.85 |
| PCH-2N•F•F | 12% | Twist [°]: | 240 |
| | 100% | MR: | 128 |
| | | B: | 12 |
| | | Refresh rate: | 80 Hz |
| | | d/P | 0.52-0.53 |

This mixture is a comparative example for Mixture Example 11 with similar compounds and comparable properties.

The invention claimed is:

1. A liquid-crystal mixture, comprising one or more compounds of formula I

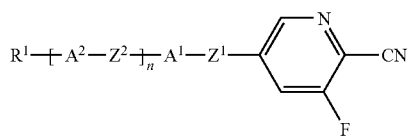

in which

R¹ denotes an alkyl radical having up to 15 C atoms which is unsubstituted, monosubstituted by CN or CF₃ or at least monosubstituted by halogen, where, in addition, one or more CH₂ groups in these radicals may be replaced by —O—, —S—, —C≡C—, —CH=CH—, —(CO)O— or —O(CO)— in such a way that O atoms are not linked directly to one another, A¹, A² each, independently, denote a ring system of the formulae

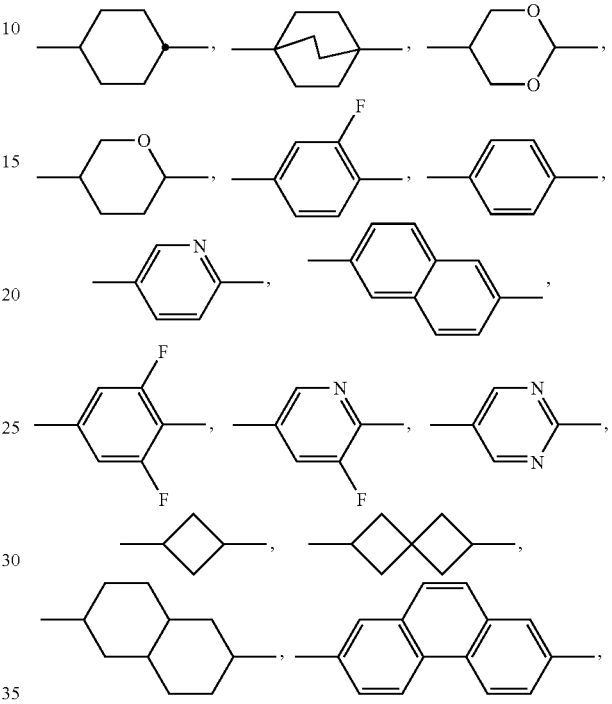

pointing to the left or right,

Z¹, Z² each, independently, denote a single bond, —CH=CH—, —C≡C— or —CH₂CH₂—, and n denotes 0, 1 or 2.

2. The liquid-crystal mixture according to claim 1, further comprising one or more alkenyl compounds of the formula II

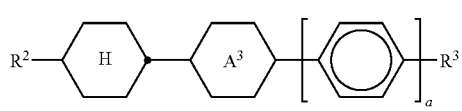

in which

R² denotes an alkenyl radical having up to 15 C atoms which is unsubstituted, monosubstituted by CN or CF₃ or at least monosubstituted by halogen, where, in addition, one or more CH₂ groups in these radicals may be replaced by —O—, —S—, —C≡C—, —CH=CH—, —(CO)O— or —O(CO)— in such a way that O atoms are not linked directly to one another, R³ is defined like R¹, the ring A³ denotes 1,4-phenylene or trans-1,4-cyclohexylene, and a is 0 or 1.

3. The liquid-crystal mixture according to claim 1, further comprising one or more tolan compounds of formula III

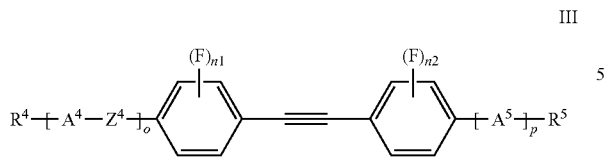

III in which
  $R^4$ and $R^5$, independently of one another, are as defined for $R^1$ in claim 1, and the rings $A^4$ and $A^5$,
    independently of one another, denote 1,4-phenylene or trans-1,4-cyclohexylene,
  $Z^4$ denotes a single bond, —O(CO)—, —(CO)O— or —C≡C—, and
  o, p, n1 and n2, independently of one another, denote 0, 1 or 2.

4. The liquid-crystal mixture according to claim 1, further comprising one or more compounds of formulae VII1, VII2 and/or VII3

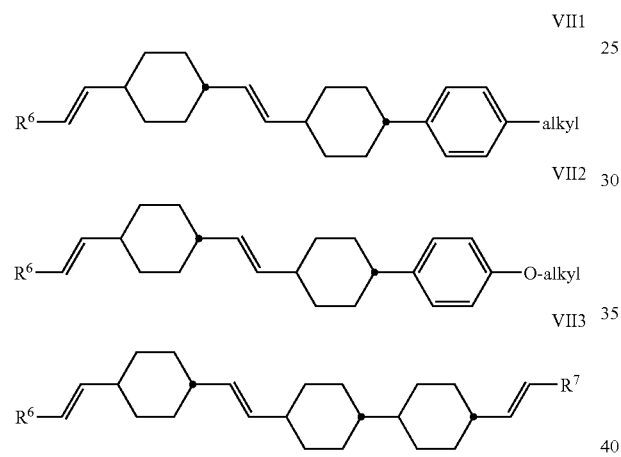

VII1

VII2

VII3 in which
  $R^6$, $R^7$ each, independently of one another, denote H, $CH_3$, $C_2H_5$, n-$C_3H_7$, n-$C_4H_9$ or n-$C_5H_{11}$ and
  'alkyl' denotes an alkyl group having 1 to 8 carbon atoms.

5. The liquid-crystal mixture according to claim 1, further comprising one or more alkenyl compounds of formula IV

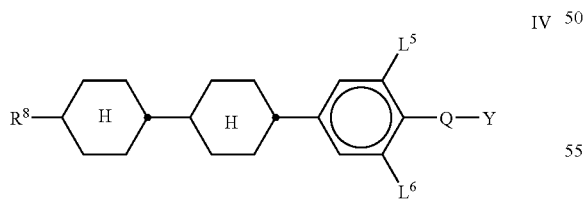

IV in which
  $R^8$ denotes an alkenyl radical having 2 to 7 carbon atoms;
  Q denotes $CF_2$, $OCF_2$, CFH, OCFH or a single bond;
  Y denotes F, $CF_3$ or Cl; and
  $L^5$ and $L^6$ each, independently of one another, denote H or F.

6. The liquid-crystal mixture according to claim 1, further comprising one or more cyano compounds of formulae Va to Vi

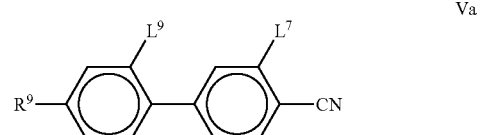

Va

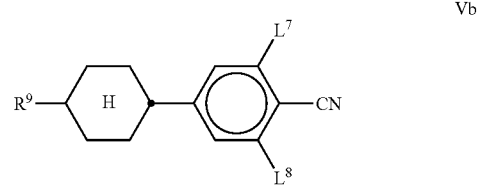

Vb

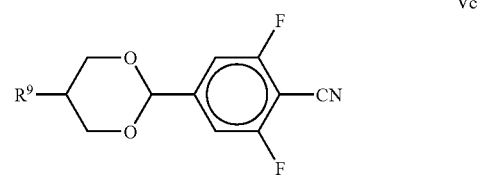

Vc

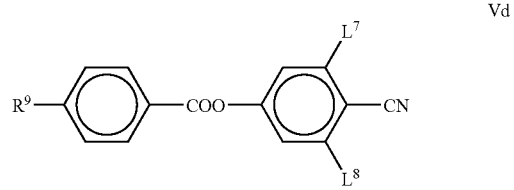

Vd

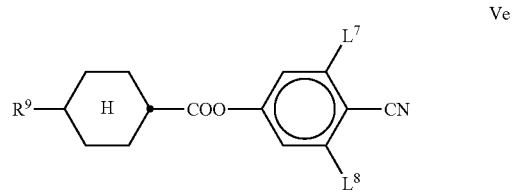

Ve

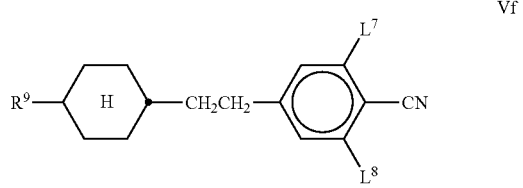

Vf

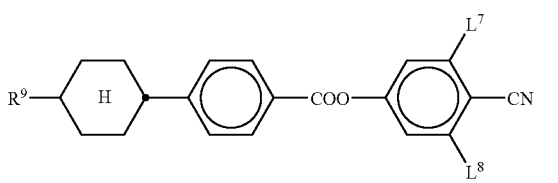

Vg

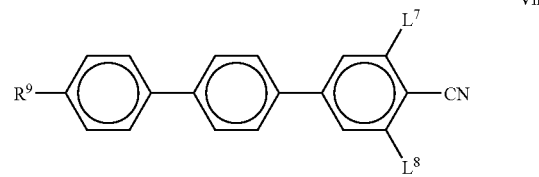

Vh

-continued

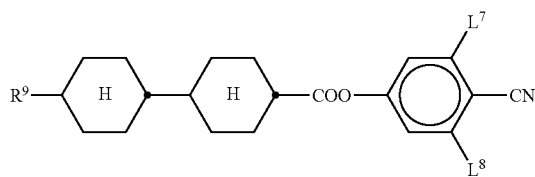
Vi in which
R⁹ denotes an alkyl or alkoxy radical having 1 to 12 carbon atoms or an alkenyl radical having 2 to 12 carbon atoms, where, in addition, one or more CH₂ groups in these radicals may be replaced by —O—, —S—, —C≡C—, —CO—, —O(CO)— or —(CO)O— in such a way that heteroatoms (O, S) are not linked directly to one another; and $L^7$, $L^8$ and $L^9$ each, independently of one another, denote H or F.

7. The liquid-crystal mixture according to claim 1, further comprising at least one cyano compound of formula Vb-1 or Vc-1

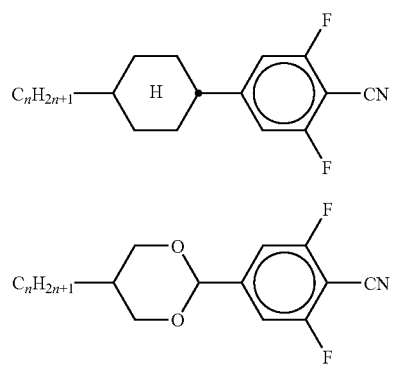

Vb-1

Vc-1 in which n=1 to 7.

8. The liquid-crystal mixture according to claim 1, having a nematic phase and positive dielectric anisotropy.

9. A nematic liquid-crystal display having
two outer plates, which, together with a frame, form a cell,
electrodes with alignment layers on the insides of the outer plates,
a pre-tilt angle between the longitudinal axis of the molecules at the surface of the outer plates and the outer plates of 0° to 30°,
a twist angle of the liquid-crystal mixture in the cell from alignment layer to alignment layer with a value of between 22.5° and 600°,
a nematic liquid-crystal mixture having positive dielectric anisotropy located in the cell, which is a nematic liquid-crystal mixture according to claim 1.

10. A nematic liquid-crystal display according to claim 9, comprising:
a) 15 to 99% by weight of a liquid-crystalline component A consisting of one or more compounds having a dielectric anisotropy of greater than +1.5;
b) 1 to 85% by weight of a liquid-crystalline component B consisting of one or more compounds having a dielectric anisotropy of between −1.5 and +1.5;
c) 0 to 20% by weight of a liquid-crystalline component C consisting of one or more compounds having a dielectric anisotropy of below −1.5, and
d) optionally an optically active component D in such an amount that the ratio between the layer thickness (separation of the outer plates) and the natural pitch of the chiral nematic liquid-crystal mixture is about 0.2 to 1.3, and at least one compound of the formula I as component A.

11. A liquid-crystal display, containing a liquid-crystal mixture according to claim 1.

12. An electro-optical component comprising a liquid-crystal mixture according to claim 1.

13. A component according to claim 12, wherein the component is an STN or IPS liquid-crystal display.

14. A compound of formula I

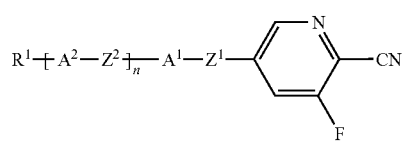
I in which
$R^1$ denotes an alkyl radical having up to 15 C atoms which is unsubstituted, monosubstituted by CN or $CF_3$ or at least monosubstituted by halogen, where, in addition, one or more CH₂ groups in these radicals may be replaced by —O—, —S—, C≡C—, —CH=CH—, —(CO)O— or —O(CO)— in such a way that O atoms are not linked directly to one another.
$A^1$, $A^2$ each, independently, denote a ring system of the formulae

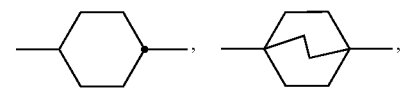

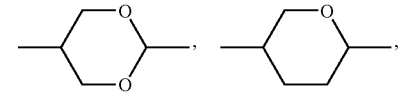

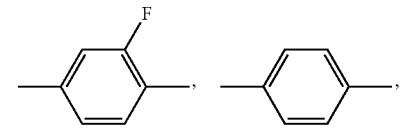

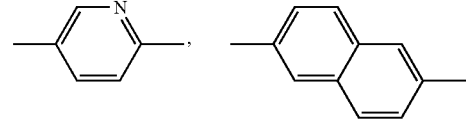

-continued

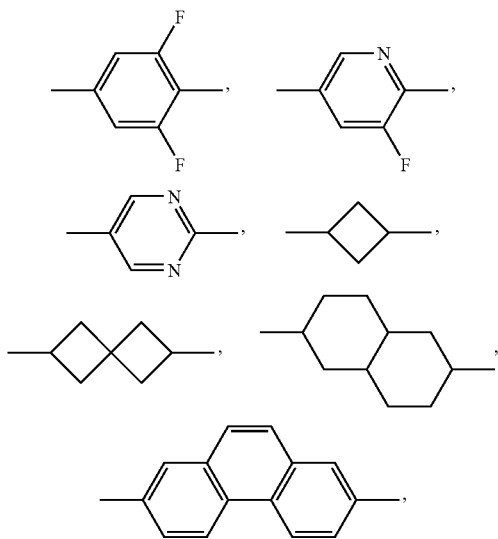

pointing to the left or right, $Z^1$, $Z^2$ each, independently, denote a single bond, —CH=CH—, —C≡C— or —CH$_2$CH$_2$— and n denotes 0, 1 or 2.

15. A compound according to claim 14 of formula I1 or I2:

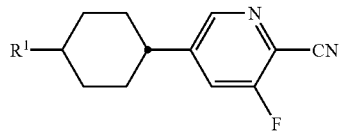

I1

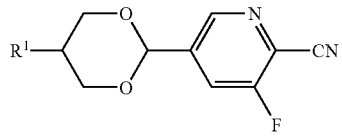

I2 in which $R^1$ is as defined above.

16. A process for the preparation of a liquid-crystal mixture according to claim 1, comprising mixing compound(s) of the formula I is with further liquid-crystalline co-components, and additives are optionally added.

* * * * *